United States Patent
Uchida et al.

[11] Patent Number: 5,688,207
[45] Date of Patent: Nov. 18, 1997

[54] CONTROL APPARATUS FOR AUTOMATIC TRANSMISSION AND CONTROL METHOD THEREFORE

[75] Inventors: Makoto Uchida; Masahiko Ibamoto, both of Hitachinaka; Kazuhiko Sato, Hitachioota; Hiroshi Kuroiwa, Hitachi; Hiroshi Ohnishi, Hitachinaka; Toshimichi Minowa, Toukai, all of Japan

[73] Assignees: Hitachi, Ltd.; Hitachi Automotive Engineering Co., Ltd., both of Japan

[21] Appl. No.: 725,052

[22] Filed: Oct. 2, 1996

Related U.S. Application Data

[63] Continuation of Ser. No. 429,909, Apr. 27, 1995, Pat. No. 5,588,936.

[30] Foreign Application Priority Data

Apr. 27, 1994 [JP] Japan .................................. 6-089367
Jul. 20, 1994 [JP] Japan .................................. 6-167704

[51] Int. Cl.$^6$ .............................. F02D 35/00; F16H 61/00
[52] U.S. Cl. ................................................................ 477/155
[58] Field of Search ................................... 477/154, 155

[56] References Cited

U.S. PATENT DOCUMENTS

| | | | |
|---|---|---|---|
| 5,089,963 | 2/1992 | Takahashi | 477/155 |
| 5,172,609 | 12/1992 | Nitz et al. | 477/155 |
| 5,272,939 | 12/1993 | Markyvech et al. | |
| 5,588,936 | 12/1996 | Uchida et al. | 477/155 |

FOREIGN PATENT DOCUMENTS

| | | |
|---|---|---|
| 0559263 | 2/1993 | European Pat. Off. |
| 2852195 | 6/1980 | Germany |
| 3023646 | 1/1981 | Germany |
| 4326182 | 2/1994 | Germany |
| 55-500122 | 3/1955 | Japan |
| 54-5167 | 1/1979 | Japan |
| 62-246655 | 10/1987 | Japan |
| 1-238748 | 9/1989 | Japan |

*Primary Examiner*—Dirk Wright
*Attorney, Agent, or Firm*—Evenson, McKeown, Edwards & Lenahan P.L.L.C.

[57] ABSTRACT

Detecting means for detecting driving conditions of a vehicle such as engine load such as throttle opening, vehicle speed, gear position or gear ratio and so on and memory means for storing characteristics of the vehicle such as engine power characteristic, torque converter characteristic, fuel consumption rate characteristic and so on are provided. Driving shaft torques before and after gear shift, an estimating value of fuel consumption rate and a gear shift point of a transmission are calculated in real time to perform transmission control using the signals from said detecting means and the signals from said memory means. With the construction according to the present invention described above, an automatic transmission can be controlled in real time by calculating a gear shift point of the transmission in a short time through estimating the driving shaft torques before and after gear shift.

4 Claims, 14 Drawing Sheets

CONTROL APPARATUS FOR AUTOMATIC TRANSMISSION AND CONTROL METHOD THEREFORE

This is a continuation of application Ser. No. 08/429,909, filed Apr. 27, 1995 now U.S. Pat. No. 5,588,936.

BACKGROUND OF THE INVENTION

1. Field of the Invention

The present invention relates to a control apparatus for an automatic transmission and control method for the automatic transmission, and more particularly relates to the control apparatus for the automatic transmission and the control method therefore capable of performing gear shifting without any gear shift schedule map by calculating a gear shift point.

2. Description of the Related Art

In the past, a gear shift schedule map used in the control apparatus for the automatic transmission is determined at developing stage of a vehicle in taking its fuel consumption characteristic, its acceleration characteristic and the like into consideration, and the gear shift schedule map is stored in a memory element mounted in the vehicle. According to this method, it is possible to control in real time with a computer having a slow calculating speed since data necessary for control can be read out from the gear shift schedule map. However, in recent time, there is a growing need for more comfortable drive and more elaborate transmission control apparatus, which leads to a complex pattern of gear shift schedule.

For example, in a technology described in Japanese Patent Application Laid-Open No.54-5167 (1979), only break points on a gear shift curve determined by load and engine speed are stored, and break points are read out when they are required to calculate a gear shift schedule by interpolating the break points. In a technology described in Japanese Patent Application Laid-Open No. 55-500122 (1980), a gear shift schedule can be changed corresponding to engine torque. In a technology described in Japanese Patent Application Laid-Open No.1-238748 (1989), how a driver intends to drive a vehicle is judged according to data such as operating amount of accelerating pedal, operation amount of brake pedal, operating amount of steering wheel, vehicle speed and so on, and condition of road, and then a gear shift schedule fit to the driver is selected. In a technology described in Japanese Patent Application Laid-Open No.62-246655 (1987), several different kinds of gear shift schedules are set trough calculation depending on driving condition. In these technologies, the gear shift schedule map is stored in its memory element in advance when the vehicle is developed. Since the gear shift schedule map depends on various parameters such as not only fuel consumption characteristic, acceleration characteristic, but also difference in individual driver's habits, difference in driving environments, difference in acceleration characteristics of respective vehicles, difference in engine braking characteristics, it takes a very long time to develop the gear shift schedule map.

SUMMARY OF THE INVENTION

The problem to be solved by the present invention is to make it unnecessary to take a long time for developing a gear shift schedule map by providing an automatic transmission control apparatus and a control method for an automatic transmission which are capable of controlling in real time with considering various parameters not only fuel consumption characteristic, acceleration characteristic without using any gear shift schedule map.

In order to solve the problem, according to the present invention, by providing at least detecting means for detecting driving conditions of a vehicle such as engine load such as throttle opening, vehicle speed, gear position or gear ratio and so on, memory means for storing characteristics of the vehicle such as engine power characteristic, torque converter characteristic, fuel consumption rate characteristic and so on, driving shaft torques before and after gear shift, an estimating value of fuel consumption rate and a gear shift point of a transmission are calculated in real time to perform transmission control using the signals from said detecting means and the signals from said memory means.

With the construction according to the present invention described above, an automatic transmission can be controlled in real time by calculating a gear shift point of the transmission in a short time through estimating the driving shaft torques before and after gear shift and the fuel consumption rate corresponding to the characteristics of the vehicle stored in said memory means. Therefore, the capacity of the memory element having stored the complex gear shift schedule map can be decreased to minimum, the manufacturing cost can be decreased since no large capacity memory element is necessary, long developing time having been used for setting the gear shift schedule map is eliminated, and it is possible to drive the vehicle with gear shift points corresponding to the driving state or running state of the vehicle and the demand of a driver.

DETAILED DESCRIPTION OF THE PREFERRED EMBODIMENTS

The present invention will be described in detail below, referring to the accompanying drawings.

Firstly, the description of the control method will be made on up-shift in which gear ratio is shifted from a lower speed state to a higher speed state, referring to a first embodiment to a fifth embodiment.

Figure 1:
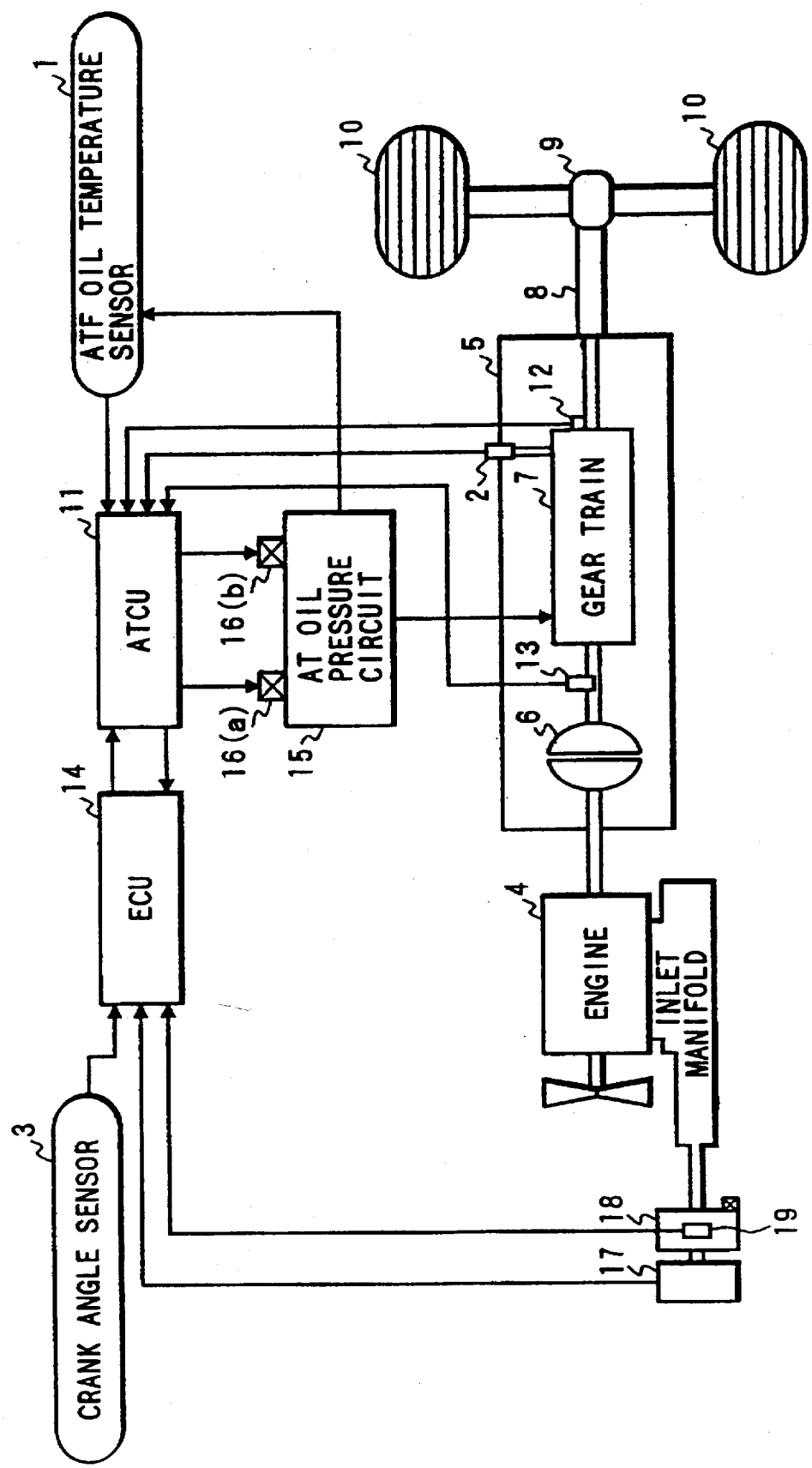
FIG. 1 shows an embodiment in accordance with the present invention and is a view showing the structure of a power train system.

FIG. 1 shows the structure of a power train system for a vehicle. Power of an engine 4 is given to a gear train 7 with amplified in its torque by a torque converter 6 in an automatic transmission 5, and then transmitted to driving wheels 10 through a differential 9 which also serves as a final reduction gear. The reference character 11 indicates an ATCU (automatic transmission control unit) which is an electronic control unit for controlling the automatic transmission and contains a micro-computer. The ATCU 11 receives the signals from an ATF (automatic transmission oil) oil temperature sensor 1, an ATF oil pressure sensor 2, a vehicle speed sensor 12, a turbine rotating speed sensor 13, and an engine rotating signal from an ECU (engine control unit) 14 which will be described later, and a throttle opening signal and so on, and executes calculation using these input values to output a valve driving signal to oil pressure control magnetic valves 16(a), 16(b) mounted on an AT oil circuit 15. The ECU 14 is an electronic control circuit for controlling the engine 4 and contains a micro-computer. The EUC 14 receives the information from an air flow sensor 17 for detecting suction air flow rate and a throttle sensor 19 in a throttle controller 18, and executes calculation using these input values to control the fuel flow rate supplied to the engine 4 and the ignition timing using the calculated result. Although this embodiment shows a method where a turbine rotating speed is obtained through calculation without using a signal from a turbine rotating speed sensor 13, either method may be employed.

Figure 2:
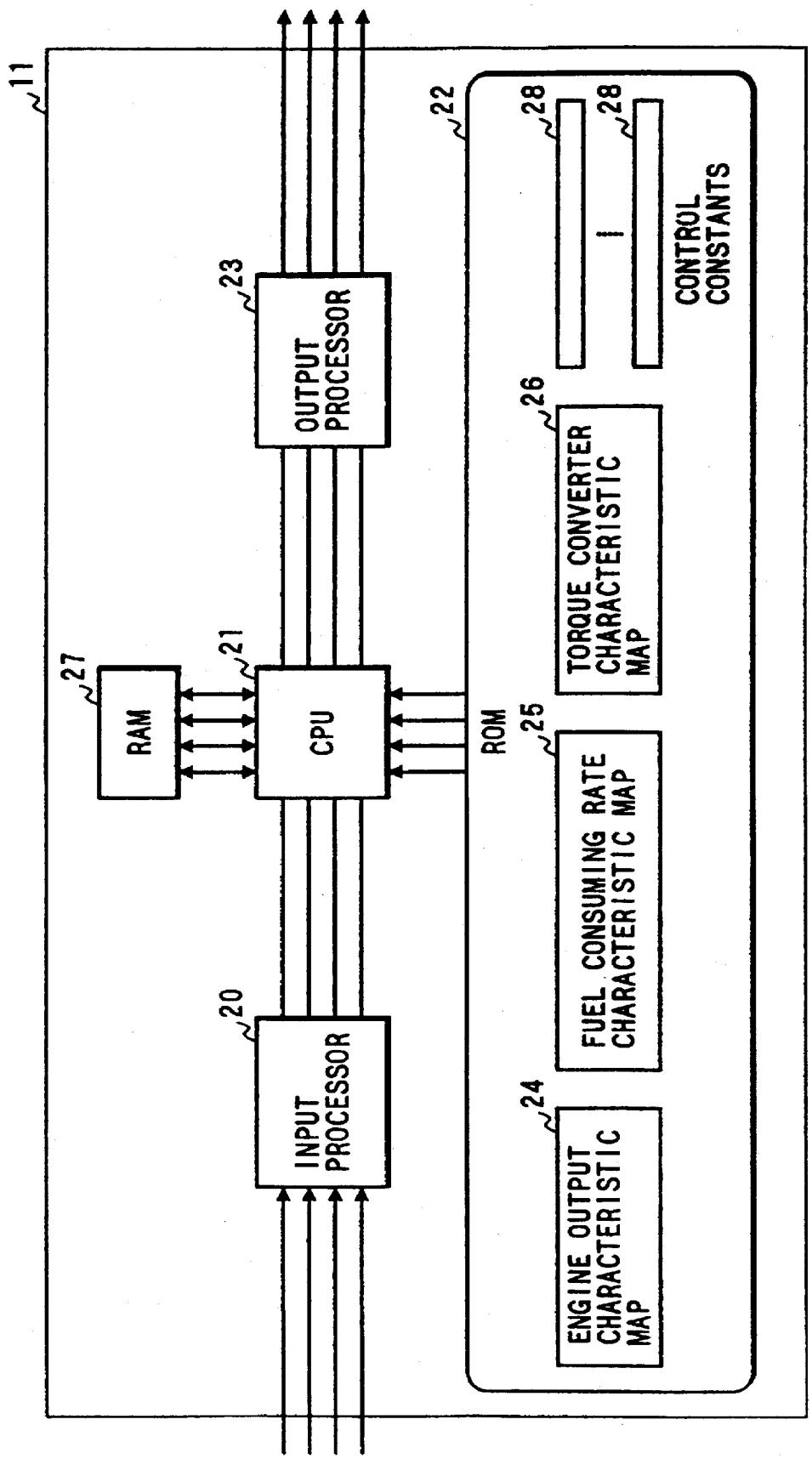
FIG. 2 is a diagram showing the structure of peripheral devices around a CPU 21 inside the ATCU 11 shown in FIG. 1.

FIG. 2 shows the structure of peripheral devices around the micro-computer in the ATCU 11 to execute the present invention. The signals from the various sensors are converted to digital signals with an input processor 20 to be transmitted to a CPU (central processing unit) 21 of microcomputer. The CPU 21 executes calculations and condition judgements based on a calculation program stored in a ROM (read only memory) 22 using the input signals and control constants 28 stored in the ROM 22 by use of a RAM (random access memory) 27 to transmit the result to an output processor 23. The calculated result is converted into a voltage with the output processor 23 to drive the oil control magnetic valves 16 shown in FIG. 1. The ROM 22 stores an engine output power characteristic map in a block 24, a fuel consumption rate characteristic map in a block 25, a torque converter characteristic map in a block 26 in addition to the control constants 28 to be used by the CPU 21. Since the amount of data of these maps is not so large, there is no need to increase the capacity of the ROM 22 so large.

Figure 3:
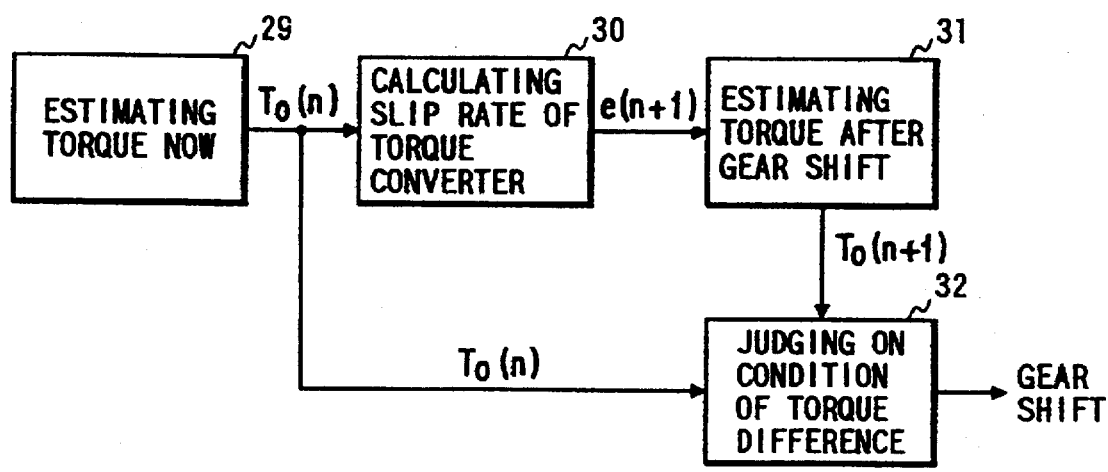
FIG. 3 shows a first embodiment in accordance with the present invention and is a block diagram showing a part of up-shifting control calculated by the ATCU 11 shown in FIG. 1.
Figure 4:
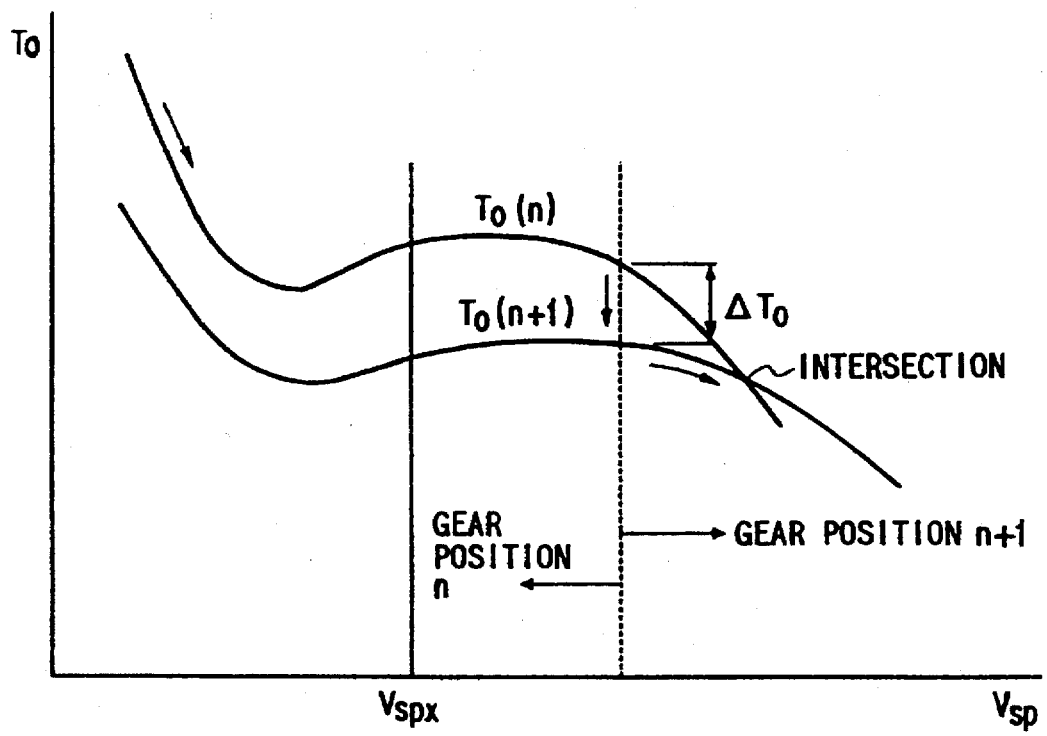
FIG. 4 is a graph showing the relationship between driving shaft torque and vehicle speed of a vehicle with throttle opening as a parameter.
Figure 5:
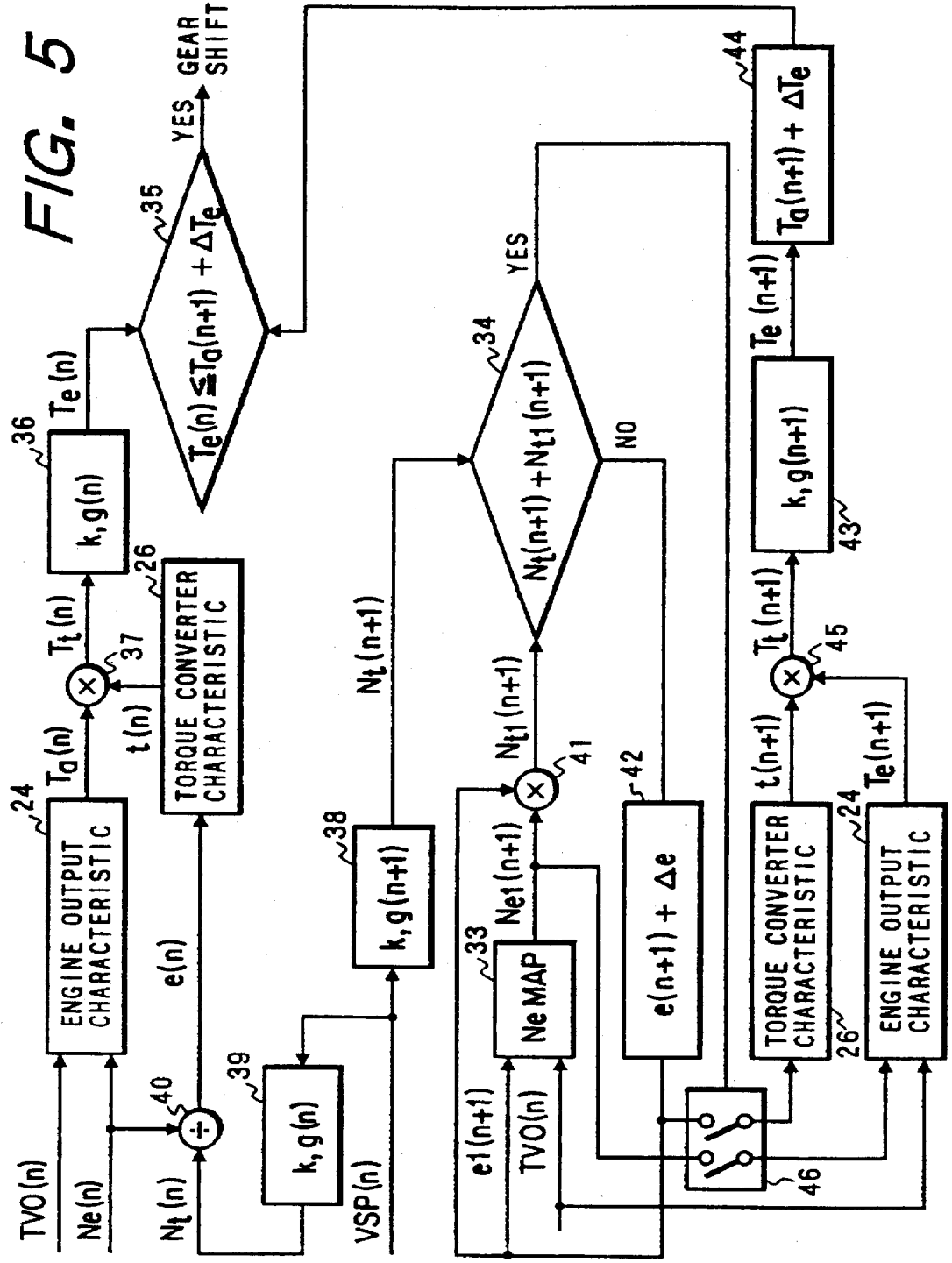
FIG. 5 is a block diagram showing the details of the control shown in FIG. 3.

FIG. 3 to FIG. 5 show the first embodiment according to the present invention. FIG. 3 is a block diagram showing a part of control calculated by the ATCU 11 described above. A driving shaft torque $T_o(n)$ now is estimated in block 29 using a method to be described later. In block 30, calculation is performed to obtain a slip ratio $e(n+1)$ of the torque converter when assuming that the gear position is shifted under condition of holding a constant throttle opening TVO before and after gear shift. In block 31, a driving shaft torque $T_o(n+1)$ after gear shift is estimated. Then in block 32, judgement on gear shift is executed by comparing the difference between the torques before and after the gear shift. Although the condition holding the throttle opening TVO before and after gear shift constant is employed here, it is possible to employ any signal typically indicating the operating state of the engine such as the amount of stepping on an acceleration pedal, the suction air flow rate to the engine, the pulse width of fuel injector, the rotating speed of the engine, the torque of the engine.

This operation will be described below, referring to FIG. 4. FIG. 4 is a graph showing the relationship between driving shaft torque $T_o$ and vehicle speed $V_{sp}$ of a vehicle with throttle opening TVO as a parameter. The ordinate is driving shaft torque $T_o$, and the abscissa is vehicle speed $V_{sp}$. The graph shows two curves for driving shaft torque $T_o$ during running with a constant throttle opening TVO, one is for a gear position (n; subscript) and the other is a gear position (n+1; subscript) in one position above the former. Since the curves $T_o(n)$ and $T_o(n+1)$ intersect with each other at a vehicle speed, it is theoretically possible to perform a smooth gear shift without occurrence of torque fluctuation by shifting the gear at this point. However, it is actually impossible to perform a smooth gear shift since the engine rotating speed at the intersection often exceeds its allowable speed due to large change in gear ratio. Therefore, it is practical that the gear position is shifted when the driving shaft torque difference approaches to $\Delta T_o(=f(TVO,g))$, function of throttle opening and gear ratio, at a vehicle speed lower than that at the intersecting point. That is, a driving shaft torque $T_o(n)$ at a vehicle speed $V_{sp}$ now and a driving shaft torque $T_o(n+1)$ after gear shift when assuming that the gear position is shifted are compared with each other every certain small increment of time. If the result satisfies the following condition, the vehicle is driven with the gear position $T_o$ now.

$$T_o(n) > T_o(n+1) + \Delta T_o.$$

If the result satisfies the following condition, the vehicle is driven by shifting to a gear position (n+1) in one position above the gear position now.

$$T_o(n) \leq T_o(n+1) + \Delta T_o.$$

By doing so, it is possible to drive the vehicle with a high torque up to a vehicle speed as fast as possible, and to lessen the torque difference at gear shifting.

FIG. 5 is a block diagram showing the details of the control shown in FIG. 3. The subscript (n) in each signal indicates a value now, and the subscript (n+1) indicates an estimated value after gear shift. An engine torque $T_e(n)$ is obtained by comparing a throttle opening TVO(n) (example of signal typically indicating the state of said engine) from the throttle sensor 19 and an engine rotating speed $N_e(n)$ from the ECU 14 with the engine output power characteristic map in block 24. On the other hand, a turbine rotating speed $N_t(n)$ is obtained by multiplying a gear ratio g(n) to a vehicle speed signal $V_{sp}(n)$ in block 39. In block 40, a slip ratio e(n) is calculated from the result and $N_e(n)$ to obtain a torque ratio t(n) by referring to the torque converter characteristic map in block 26. Using the result and $T_e(n)$ obtained before, in block 37, a turbine torque $T_t(n)$ is calculated. Further, in block 36, a driving shaft torque $T_o(n)$ is obtained by multiplying the gear ratio g(n).

The driving shaft torque $T_o(n+1)$ when assuming that the gear position is shifted will be estimated below. Calculation is performed using g(n+1) as a gear ratio. In block 38, a turbine rotating speed $N_t$ is obtained by multiplying the gear ratio g(n+1) to the vehicle speed $V_{sp}(n)$ now under assumption that the vehicle speed does not changed just after the gear shift. Therein, a slip ratio e(n+1) of the torque converter balancing with the turbine rotating speed of $N_t(n+1)$ is obtained assuming that the throttle opening TVO is kept constant also after the gear shift. Therefore, an engine rotating speed $N_e$ map is provided in block 33. The $N_e$ map is made by calculating the relationship of engine rotating speed $N_e$ versus the throttle opening TVO and the slip ratio e. An engine rotating speed $N_{e1}(n+1)$ is obtained from block 33 indicating the $N_e$ map by giving a suggested slip ratio $e_1(n+1)$ to the $N_e$ map. In block 41, a turbine rotating speed $N_{t1}(n+1)$ is obtained by multiplying $e_1(n+1)$ to the engine rotating speed $N_{e1}(n+1)$. Iterating calculation is performed by adding a correction value $\Delta e$ to $e_{e1}(n+1)$ until the turbine rotating speed $N_{t1}(n+1)$ becomes equal to the $N_t(n+1)$ in block 34 indicating comparing process. Using a speed ratio e(n+1) when $N_{t1}(n+1)$ becomes equal to the $N_t(n+1)$, a torque ratio t(n+1) is estimated from the torque converter characteristic map in block 26, and an engine torque $T_e(n+1)$ is estimated by comparing the engine rotating speed $N_e(n+1)$ and the throttle opening TVO(n) with the engine output power characteristic map in block 24. In block 45, a turbine torque $T_t(n+1)$ can be estimated by make product of the both values. And, in block 43, a driving shaft torque $T_o(n+1)$ can be estimated by multiplying the gear ratio g(n+1) to the turbine torque $T_t(n+1)$. In block 35 indicating driving shaft torque comparing process, a value of $T_o(n+1)$ added with a given correction value $\Delta T_o$ is compared with the value $T_o$ obtained before. If the following condition is satisfied, the gear is shifted to the gear position (n+1) in one position above the gear position now.

$$T_o(n) \leq T_o(n+1) + \Delta T_o.$$

Instead of using the $N_e$ map, it is possible to employ a method in which calculation is performed by adding the correction values $\Delta e$ and $\Delta N_e$ to e(n+1) and $N_e(n+1)$ respectively to scan the whole region. It is no need to say that the turbine rotating speed now may be directly detected from the turbine rotating speed sensor 13 instead of calculating from the vehicle speed.

As described above, according to the present invention, a driving shaft torque $T_o(n)$ in a gear position (n) now and a driving shaft torque $T_o(n+1)$ in a gear position (n+1) one position above the gear position now are obtained and compared with each other every certain small increment of time. If the result satisfies the condition $T_o(n) > T_o(n+1) + \Delta T_o$, the vehicle is driven with the gear position (n) now. If the result satisfies the condition $T_o(n) \leq T_o(n+1) + \Delta T_o$, the vehicle is driven by shifting to a gear position (n+1) in one position above the gear position now. Therefore, it is possible to calculate a gear shift point, to drive the vehicle with a high torque up to a vehicle speed as fast as possible, and to lessen the torque difference at gear shifting.

Figure 6:
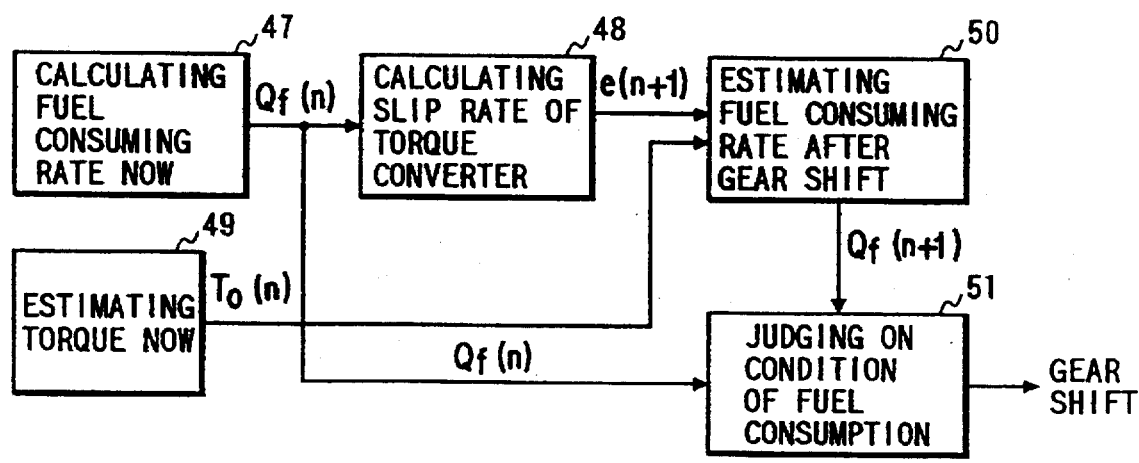
FIG. 6 shows a second embodiment in accordance with the present invention and is a block diagram showing a part of up-shifting control calculated by the ATCU 11 shown in FIG. 1.
Figure 7:
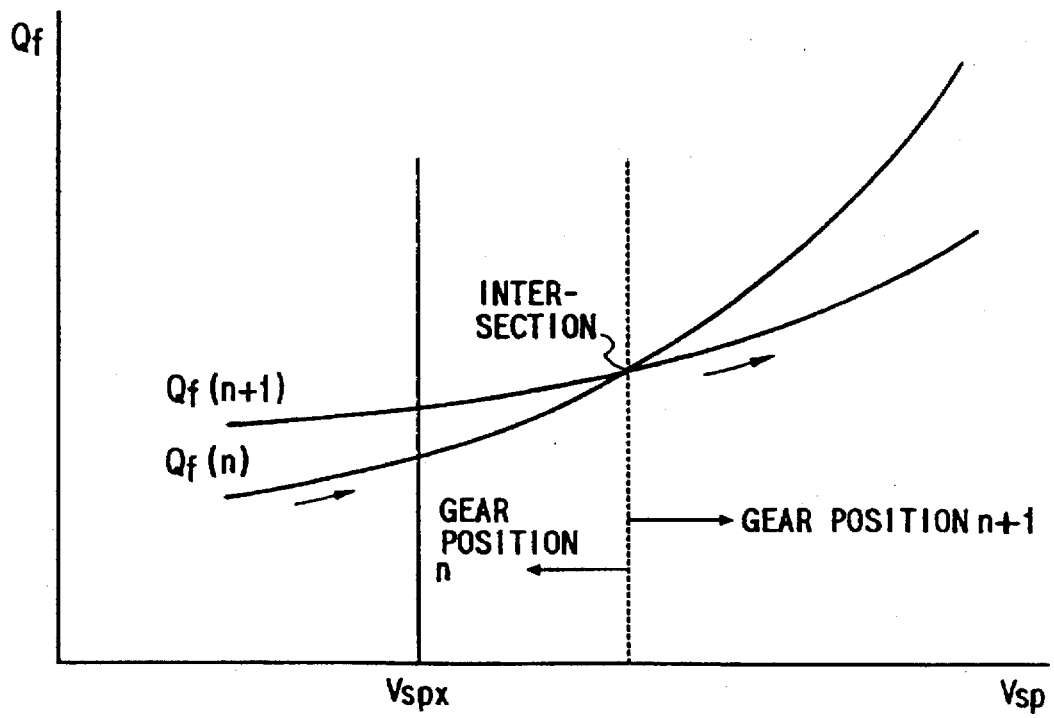
FIG. 7 is a graph showing the relationship between fuel consumption rate and vehicle speed of a vehicle.
Figure 8:
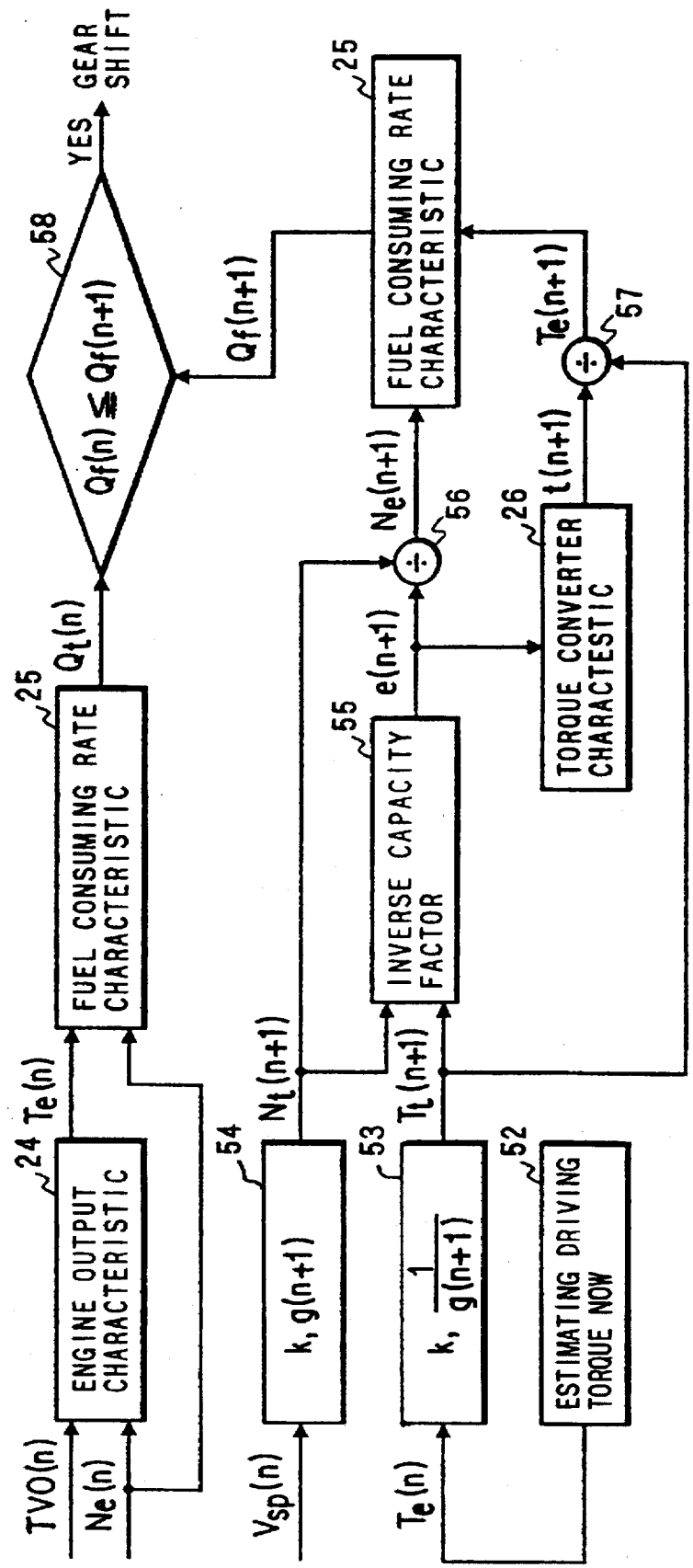
FIG. 8 is a block diagram showing the details of the control shown in FIG. 6.

FIG. 6 to FIG. 8 show the second embodiment according to the present invention. FIG. 6 is a block diagram showing a part of control calculated by the ATCU 11. In this embodiment, control is performed with giving a high priority to low fuel consuming rate after gear shift even when a driver steps further on an acceleration pedal not to cause lack of torque after gear shift. In this method, in block 47 a fuel consuming rate $Q_f(n)$ now is estimated through a method to be described later. In block 48, a slip ratio e(n+1) of the converter when assuming that the gear position is shifted is calculated. Using this value and a driving shaft torque $T_o(n)$ now estimated in block 49 through the method having been described in the first embodiment of the present invention, a fuel consuming rate $Q_f(n+1)$ after gear shift is estimated in block 50. Then, in block 51, judging is executed on whether the gear position is shifted or not by comparing the fuel consuming rates before and after gear shift. This operation will be described, referring to FIG. 7. The ordinate of FIG. 7 is fuel consuming rate $Q_f$, and the abscissa is vehicle speed $V_{sp}$. FIG. 7 is a graph showing the fuel consuming rates when a vehicle is driven with a gear position (n) now and with a gear position (n+1) in one position above the gear position now. The both curves intersect with each other at a vehicle speed. A fuel consuming rate $Q_f(n)$ in a gear position (n) now and a fuel consuming rate $Q_f(n+1)$ in a gear position (n+1) by one position above the gear position now at a vehicle speed $V_{spx}$ now are compared with each other every certain small increment of time. If the result satisfies the condition $Q_f(n) < Q_f(n+1)$, the vehicle is driven with the gear position (n) now. If the result satisfies the condition $Q_f(n) \theta Q_f(n+1)$, the vehicle is driven by shifting to a gear position (n+1) by one position above the gear position now. By doing so, it is possible to drive with a low fuel consumption.

FIG. 8 is a block diagram showing the details of the control shown in FIG. 6. An engine torque $T_e(n)$ is obtained by comparing a throttle opening TVO(n) with the engine output power characteristic map in block 24. A fuel consuming rate $Q_f(n)$ is obtained by comparing the result and an engine rotating speed signal $N_e(n)$ with the fuel consuming rate characteristic map in block 25. Next, a fuel consuming rate when assuming that the gear position is shifted is estimated. If the throttle opening TVO is not changed after the gear shift, the fuel consuming rate after the gear shift decreases by the amount corresponding to the decrease in engine rotating speed. This is no need to be calculated. Therefore, with supposing a case where a driver unintentionally steps further on an acceleration pedal to compensate the decrease in torque after gear shift, a point where fuel consuming rate becomes small even such a case will be searched as a gear shifting point.

The fuel consuming rate after gear shift varies depending on the stepping amount of the acceleration pedal. It is considered, as an extreme case, that the accelerating pedal is stepped on up to a position where the driving shaft torque $T_o$ before gear shift is kept unchanged after gear shift. In block 52, a driving shaft torque $T_o(n)$ is obtained through the same method as in the first embodiment according to the present invention. In block 53, a turbine torque $T_t(n+1)$ is estimated by dividing the result with a gear ratio g(n+1) after gear shift. In block 54, a turbine rotating speed $N_t(n+1)$ is obtained by multiplying the gear ratio(n+1) to a vehicle speed signal $V_{sp}(n)$ since the vehicle speed $V_{sp}$ is held constant just after gear shift. Here, a slip ratio e(n+1) of the torque converter after gear shift will be estimated. Similarly to the well-known input capacity factor, an inverse capacity factor using a turbine torque $T_t$ and a turbine rotating speed $N_t$ in the output side of the torque converter is defined as $C_p'=T_t/N_{t2}$. The relationship between the inverse capacity factor and the slip ratio is calculated in advance and stored in block 55 as an inverse capacity factor characteristic. A slip ratio e(n+1) is obtained by comparing the $N_t$(n+1) calculated in block 54 and the $T_t$(n+1) calculated in block 53 with the inverse capacity factor characteristic in block 55. And a torque ratio t(n+1) is obtained by comparing the slip ratio e(n+1) with the torque converter characteristic map in block 26. In block 56 an engine rotating speed $N_e$(n+1) is estimated using the slip ratio e(n+1) and the turbine rotating speed $N_t$(n+1) obtained before, and in block 57 an engine torque $T_e$(n+1) is estimated by multiplying the torque ratio t(n+1) to the turbine torque $T_t$(n+1). Then, a fuel consuming rate $Q_f$(n+1) after gear shift can be estimated by comparing the engine rotating speed $N_e$(n+1) and the engine torque $T_e$(n+1). In a fuel consuming rate comparing process of block 58, by comparing $Q_f$(n) and $Q_f$(n+1) in real time, if the result satisfies the condition $$Q_f(n) \geq Q_f(n+1),$$

the vehicle is driven by shifting to a gear position (n+1) by one position above the gear position now.

According to the embodiment, a fuel consuming rate $Q_f$(n) in a gear position (n) now and a fuel consuming rate $Q_f$(n+1) in a gear position (n+1) by one position above the gear position now at a vehicle speed $V_{sp.x}$ now are compared with each other every certain small increment of time. If the result satisfies the condition $Q_f(n) < Q_f(n+1)$, the vehicle is driven with the gear position (n) now. If the result satisfies the condition $Q_f(n) \geq Q_f(n+1)$, the vehicle is driven by shifting to a gear position (n+1) in one position above the gear position now. By doing so, it is possible to drive with a low fuel consumption.

Figure 9:
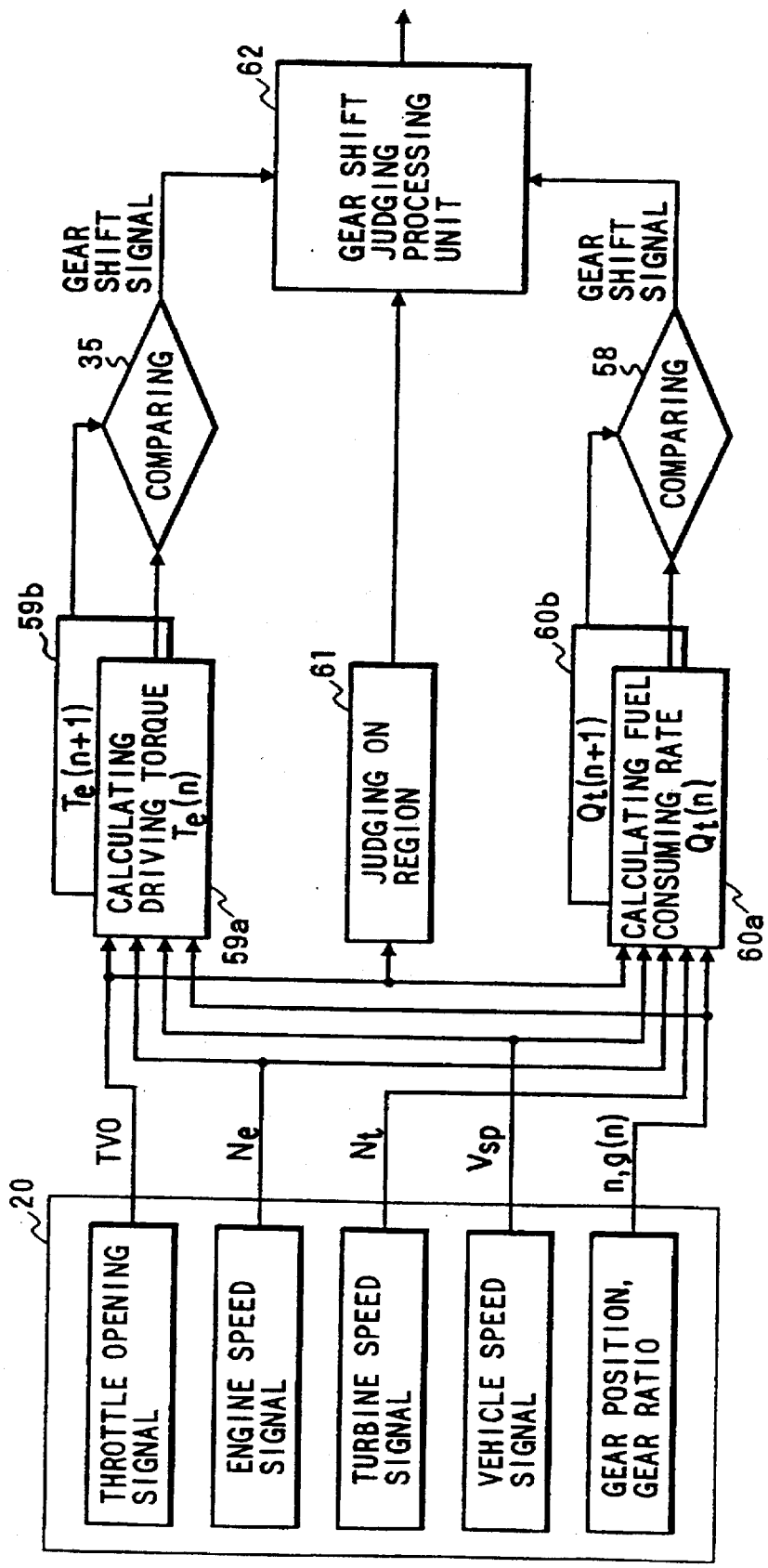
FIG. 9 shows a third embodiment in accordance with the present invention and is a block diagram showing an up-shifting control where judging is executed on which the priority is put on, fuel consumption rate or driving shaft torque, for determining the gear shift point.

FIG. 9 shows a third embodiment in accordance with the present invention. FIG. 9 is a block diagram showing control where judging is executed on which the priority is put on, fuel consumption rate or driving shaft torque, for determining the gear shift point. The fuel consuming rate and the driving shaft torque are in an inverse relationship. In driving shaft torque calculating parts shown by blocks 59a, 59b, driving shaft torques $T_o$(n), $T_o$(n+1) are obtained by comparing with the engine output power characteristic map in block 24 and the torque converter characteristic map in block 26 shown in FIG. 2 using a throttle opening TVO, an engine rotating speed $N_e$, a turbine rotating speed $N_t$, a vehicle speed $V_{sp}$, a gear position n, a gear ratio g(n). A driving shaft torque $T_o$(n) now and a driving shaft torque $T_o$(n+1) after gear shift are obtained every certain small increment of time to execute gear shifting judgement by comparing the driving shaft torques before and after gear shift in the same way as in the first embodiment according to the present invention. Similarly, in fuel consuming rate calculating parts shown by blocks 60a, 60b, fuel consuming rates $Q_f$(n), $Q_f$(n+1) are obtained by comparing with the engine output power characteristic map in block 24 and the torque converter characteristic map in block 26 shown in FIG. 2. A fuel consuming rate $Q_f$(n) now and a fuel consuming rate $Q_f$(n+1) after gear shift are obtained every certain small increment of time to execute gear shifting judgement by comparing the fuel consuming rates before and after gear shift in the same way as in the second embodiment according to the present invention.

Which calculated result is used for gear shifting is determined depending on the output from a region judging part in block 61. For example, a driver's intention can be recognized by the stepping degree of the accelerating pedal. When the accelerating pedal is lightly stepped, it is during running at a constant speed. At that time, the region judging part in block 61 judges it as fuel consuming rate priority to allow a gear shift judging processing unit in block 62 to perform gear shifting control through comparing the fuel consuming rates. When the accelerating pedal is deeply stepped, the region judging part in block 61 judges it as acceleration priority to allow a gear shift judging processing unit in block 62 to perform gear shifting control through comparing the driving shaft torques before and after gear shift. Let the entirely close of the throttle opening TVO be 0 (zero), and the full open be 1 (one). The gear shift judging processing unit stores vehicle speeds corresponding to an engine rotating speed smaller than the maximum limit value of the engine rotating speed $N_e$ by a given value for the states where the throttle opening TVO is between ⅛ to 1, and vehicle speeds faster than the limit speeds during creep running with the idling rotating speed by a given value for the states where the opening is between 0 to 0.⅝ in advance. When an actual vehicle speed reaches the preset vehicle speed, the gear is shifted to the gear position g(n+1) by one position above the gear position now.

As described above, according to the embodiment, by detecting the operating state of the vehicle or the driving state of the vehicle such as throttle opening, engine rotating speed, vehicle speed, gear position or gear ratio, a gear shifting point of the transmission is calculated by switching calculation method depending on the stepping amount of the throttle opening using said calculating process corresponding to the detected signal, and the gear shifting point is output based on said calculated value. Therefore, a long developing time having been used for setting the gear shift schedule map is eliminated, and the developing man-hour can be largely decreased.

Figure 10:
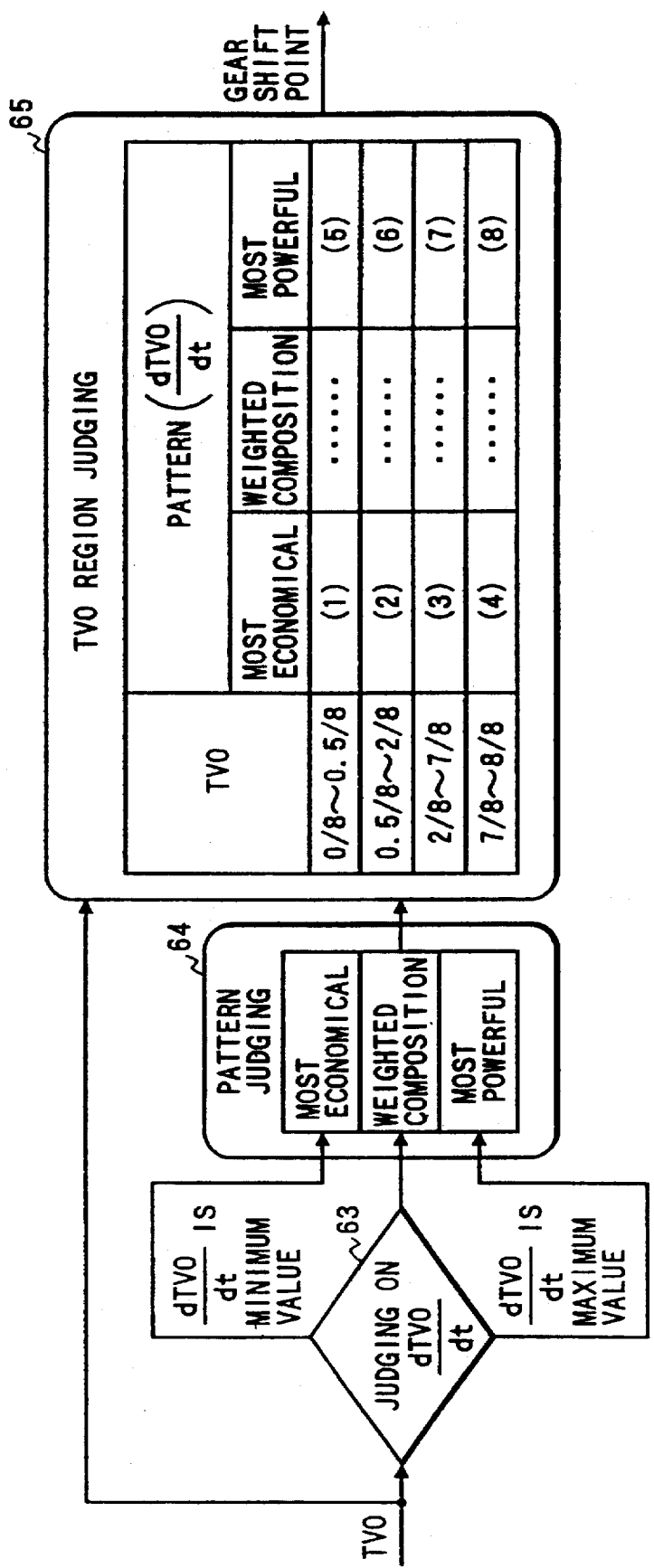
FIG. 10 shows a fourth embodiment in accordance with the present invention and is a block diagram showing an up-shifting control where judging is executed using time differentiation of throttle opening in addition to the control shown in the third embodiment.

FIG. 10 shows a fourth embodiment in accordance with the present invention and is a block diagram showing an up-shifting control where judging is executed using time differentiation of throttle opening in addition to the control shown in the third embodiment. In this embodiment, by dividing a pattern region with considering not only the throttle opening TVO but also its time differentiation dTVO/dt, a gear shifting point can be calculated by continuously selecting between the low fuel consuming driving and the acceleration priority driving. In a judging process part for dTVO/dt shown in block 63, judgment is executed which the magnitude of dTVO/dt is a preset minimum value, or a preset maximum value, or between the both values. In a pattern judging process part in block 64, pattern for calculation is judged. In a TVO region judging process in block 65, a gear shifting pattern is determined. When dTVO/dt is the minimum value, a gear shifting pattern putting priority on the fuel consuming rate operation is selected. When dTVO/dt is the maximum value, a gear shifting pattern putting priority on the acceleration is selected. When dTVO/dt is between the both values, the gear shifting pattern putting priority on the fuel consuming rate operation and the gear shifting pattern putting priority on the acceleration are composed with weights. If a gear shifting pattern signal is the most economical pattern of the gear shifting pattern putting priority on the fuel consuming rate operation, a gear shifting point is calculated through any one of the methods (1) to (4) in the TVO region judging process part in block 65 depending on the magnitude of the throttle opening TVO. If a gear shifting pattern signal is the most powerful pattern of the gear shifting pattern putting priority on the acceleration, a gear shifting point is calculated through any one of the methods (5) to (8) in the TVO region judging process part in block 65 depending on the magnitude of the throttle opening TVO. If the gear shifting signal is between the most economical pattern and the most powerful pattern, a gear shifting point is calculated through weighted composition depending on the magnitude of the throttle opening TVO.

Therein, the calculations in (3), (6), (7) in the TVO region judging process in block 65 are to be applied to the first embodiment according to the present invention described above. In the first embodiment, a driving shaft torque $T_o(n)$ now is obtained and a driving shaft torque $T_o(n+1)$ when assuming that gear is shifted is estimated under assumption of being the throttle opening the same as that before gear shift. When the driving shaft torque $T_o(n)$ becomes smaller than the sum of the driving shaft torque $T_o(n+1)$ and the torque difference $\Delta A_o(=f(TVO, g))$ which is a function of the throttle opening TVO and the gear ratio g (that is, $T_o(n) \leq T_o(n+1)+\Delta T_o$), the gear is shifted. However, the torque difference $\Delta T_o$ at the most economical pattern in (3) in the TVO region judging process in block 65 is different from that at the most powerful pattern in (6) or (7). The torque difference $\Delta T_o$ at most economical pattern in (3) is set to the lower vehicle speed side of the torque difference at most powerful pattern in (6) or (7).

The calculation in (2) in the TVO region judging process in block 65 is to be applied to the second embodiment according to the present invention described above.

Further, the calculations in (4), (8) in the TVO region judging process in block 65 are for storing vehicle speeds corresponding to an engine rotating speed smaller than the maximum limit value of the engine rotating speed $N_e$ by a given value in advance and shifting the gear up to a gear position g(n+1) by one position above the gear position now when a vehicle speed reaches the preset vehicle speed. And the calculations in (1), (5) in the TVO region judging process in block 65 are for storing vehicle speeds faster than the limit speeds during creep running with the idling rotating speed by a given value in advance and shifting the gear up to a gear position g(n+1) by one position above the gear position now when a vehicle speed reaches the preset vehicle speed.

As described above, according to the embodiment, by dividing the pattern region with considering not only the throttle opening but also its changing rate, a gear shifting point is calculated in real time by continuously selecting a state between the economical to the powerful regions and the gear shifting position is output based on the calculation. Therefore, a long developing time having been used for setting the pear shift schedule map is eliminated, and the developing man-hour can be largely decreased.

Figure 11:
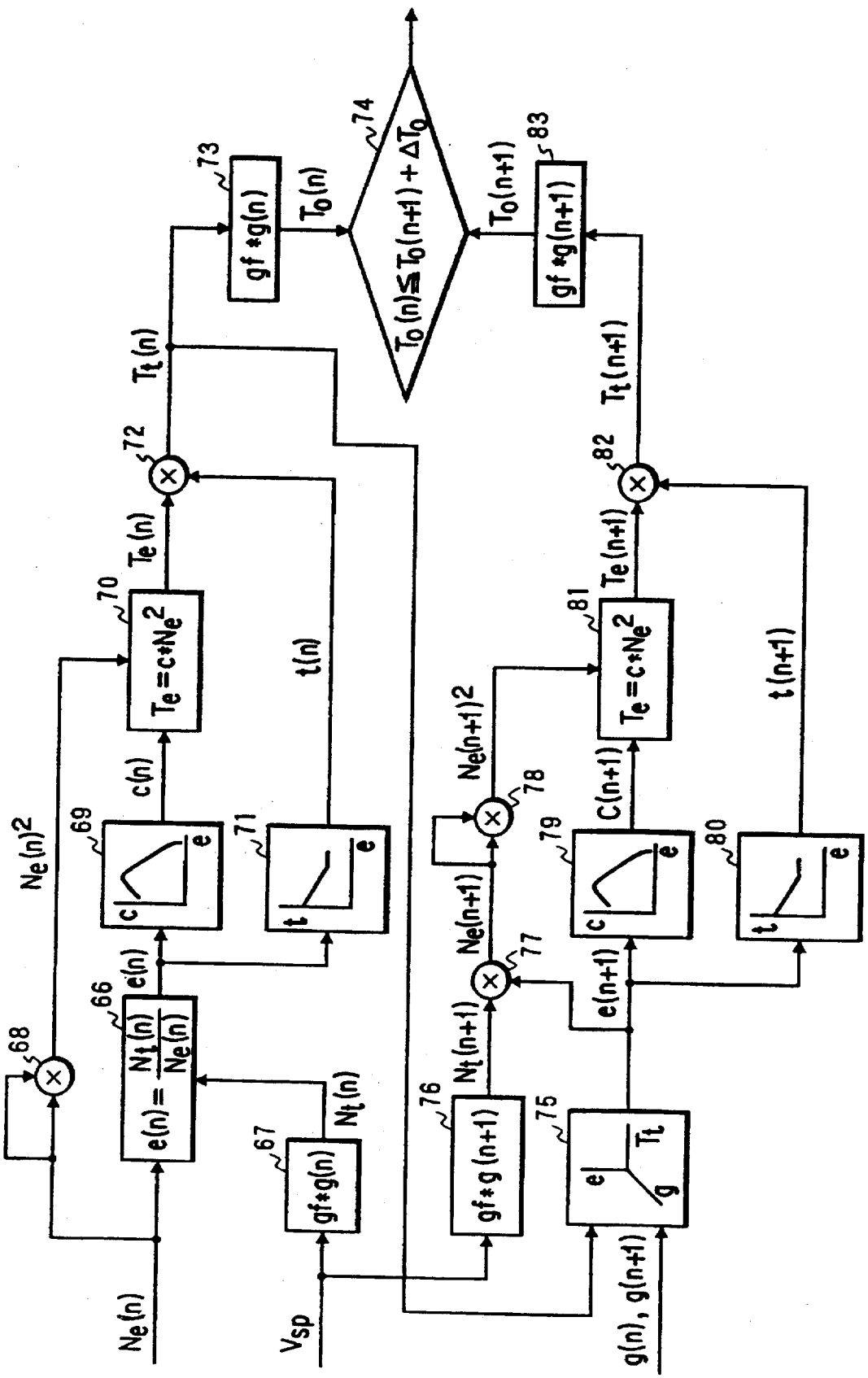
FIG. 11 shows a fifth embodiment in accordance with the present invention and is a block diagram showing an up-shifting control utilizing torque converter characteristic.

FIG. 11 shows a fifth embodiment in accordance with the present invention. In this embodiment, the engine torque $T_e$ and driving shaft torque $T_o$ are estimated using the torque converter characteristic without using the engine output characteristic. An engine rotating speed $N_e(n)$ and an output rotating speed obtained by multiplying a gear ratio g(n) in the gear state linking now to a vehicle speed $V_{sp}$, that is, turbine rotating speed $N_t(n)$ are input to block 66 to calculate a slip ratio e(n) of the torque converter through the equation $e(n)=N_t(n)/N_e(n)$. The slip ratio e(n) is transmitted to block 69. In block 69, a pump capacity coefficient C(n) corresponding to e(n) is extracted from an e-C characteristic stored in advance. In block 70, an engine torque $T_e(n)$ is calculated by receiving the pump capacity coefficient C(n) and the square of the engine rotating speed $\{N_e(n)\}^2$ through the equation $T_e=C(n)\cdot\{N_e(n)\}^2$. On the other hand, in block 71, a torque ratio t(n) corresponding to e(n) is extracted from an e-t characteristic stored in advance. A turbine torque $T_t(n)$ can be obtained by making production of both of the engine torque $T_e(n)$ and the torque ratio t(n). In block 73, a driving shaft torque $T_o(n)$ can be obtained by multiplying the gear ratio g(n) now and a final gear reduction ratio $g_f$ to the turbine torque $T_t(n)$. This is the estimated driving shaft torque for the gear position now.

Description will be made below on a method of estimating a driving shaft torque $T_o(n+1)$ in a case where a gear position is shifted to the next gear position (a gear position in the higher gear side of the gear position now by one position), that is, up-shifting with holding the acceleration opening, that is, the throttle opening in the gear position now constant. An important point here is what value the slip ratio e(n+1) of the torque converter takes when the gear is shifted to the next gear position. In regarding to this problem, the inventors has conducted various kinds of experimental studies and the following is clarified. The slip ratio e(n+1) is univocally determined by the turbine torque $T_t(n)$ before gear shift and the gear shifting state, that is, gear shifting from first gear position to second gear position, gear shifting from second gear position to third gear position, gear shifting from third gear position to fourth gear position. Let the gear shifting from the first gear position to the second gear position be expressed by subscript 12. The slip ratio $e(n+1)_{12}$ is expressed by a function of the turbine torque $T_t(n)_{12}$. In other expressions, the following equations are held.

For gear shifting from the first gear position to the second gear position, $$e(n+1)_{12}=f(T_t(n)_{12}).$$

For gear shifting from the second gear position to the third gear position, $$e(n+1)_{23}=f(T_t(n)_{23}).$$

For gear shifting from the third gear position to the fourth gear position, $$e(n+1)_{34}=f(T_t(n)_{34}).$$

Therefore, by using these equations or by storing the maps of these equations in advance, using a turbine torque $T_t(n)$ the slip ratio e(n+1) is calculated or extracted by retrieving in block 75. The engine rotating speed $N_e(n+1)$ in the next gear position is calculated by multiplying the predicted slip ratio e(n+1) for the next gear position derived as described above to the turbine rotating speed $N_t(n+1)$ in the next gear position obtained from the vehicle speed $V_{sp}$ now and the gear ratio g(n+1) in the next gear position as follows.

$$N_e(n+1)=e(n+1)\cdot N_t(n+1)$$

On the other hand, in block 79, C(n+1) is extracted from the pre-stored e-C characteristic. And, in block 80, t(n+1) is extracted from the pre-stored e-t characteristic. In order to estimate a turbine torque $T_t(n+1)$ in the next gear position, in block 81, the following equation is firstly calculated.

$$T_e(n+1)=C(n+1)\cdot\{N_e(n+1)\}^2$$

Then, by multiplying the gear ratio g(n+1) in the next gear position and the final gear reduction ratio $g_f$, the driving shaft torque $T_o(n+1)$ can be estimated. In a driving shaft torque comparing process in block 74, using the driving shaft torques $T_o(n)$, $T_o(n+1)$ obtained as described above, it is judged whether the condition, $T_o(n) \leq T_o(n+1)+\Delta T_o$, is satisfied or not. If satisfied, the gear is shifted to the gear position in one position above. Therein, $\Delta T_o$ is a preset constant correction value.

The logic of estimating the driving shaft torque $T_o$ shown in FIG. 11 is a method in which the driving shaft torque $T_o$ is estimated using only the torque converter characteristic without using the engine output characteristic (the pre-stored engine torque $T_e$ versus engine rotating speed and the throttle opening TVO characteristic). Therefore, there is an advantage in that an input torque to a torque converter, that is, an engine torque $T_e$ can be estimated from a driving shaft torque $T_o$ even when in an engine having two operating regions of largely different torques, the engine is controlled in such that the operating state is changed between the both regions. The typical engine of such type is a lean-burn engine which has two operating regions in the same throttle opening TVO corresponding to lean air-fuel ratio A/F, one is theoretical air-fuel ratio A/F=14.7 and the other is lean air-fuel ratio A/F=23 to 25. The same thing can be said for an engine with super charger, an engine of variable suction length, an engine of variable valve timing, an engine of variable compression ratio or variable expansion ratio. Further, although a turbine rotating speed $N_t$ in the above embodiment has been calculated using a vehicle speed $V_{sp}$ and a gear ratio g, it is no need to say that the turbine rotating speed may be directly detected by the turbine rotating speed sensor 13 shown in FIG. 1.

Description will be made on down-shifting where a gear ratio is shifted from the higher speed side to the lower speed side, referring to a sixth embodiment to a eighth embodiment according to the present invention.

Figure 12:
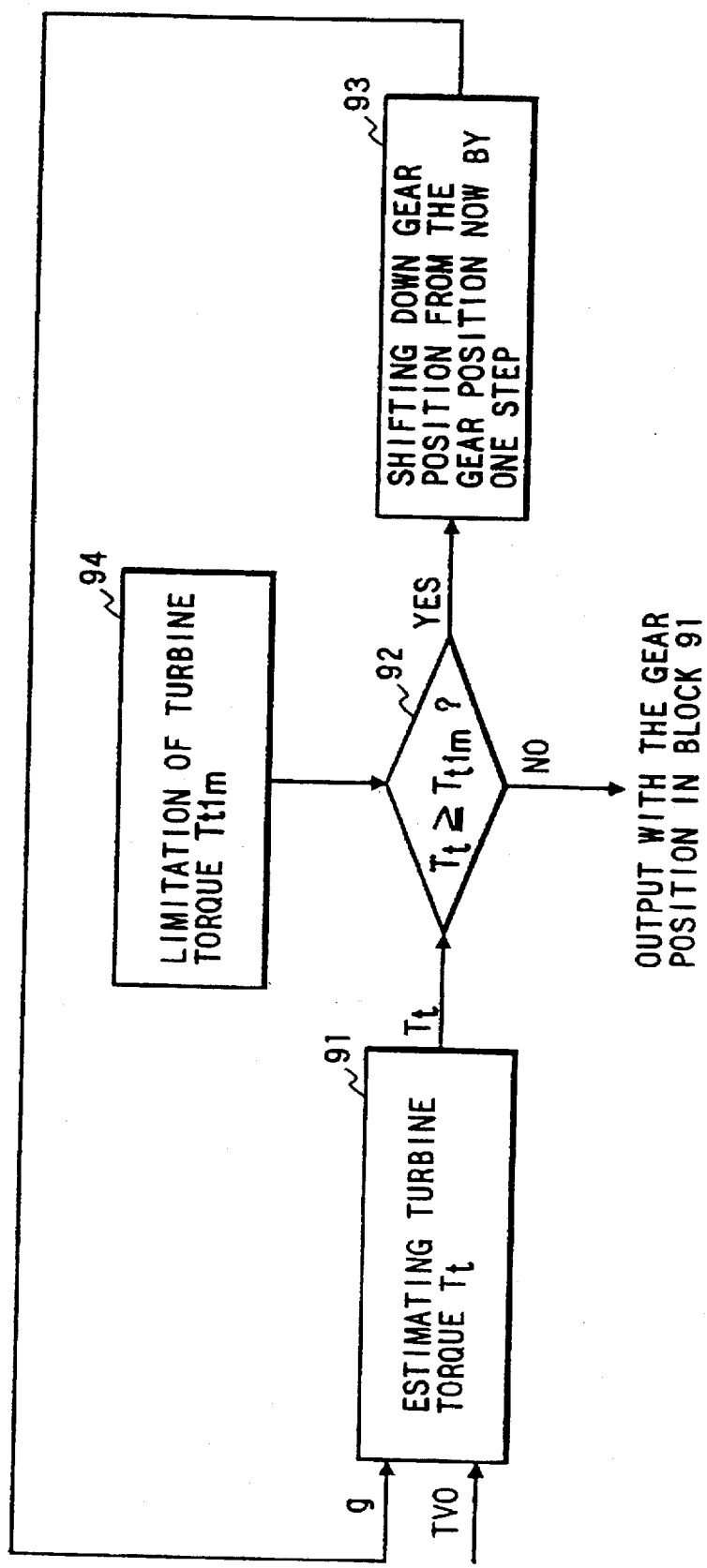
FIG. 12 shows a sixth embodiment in accordance with the present invention and is a block diagram showing a part of down-shifting control calculated by the ATCU 11 shown in FIG. 1.
Figure 13:
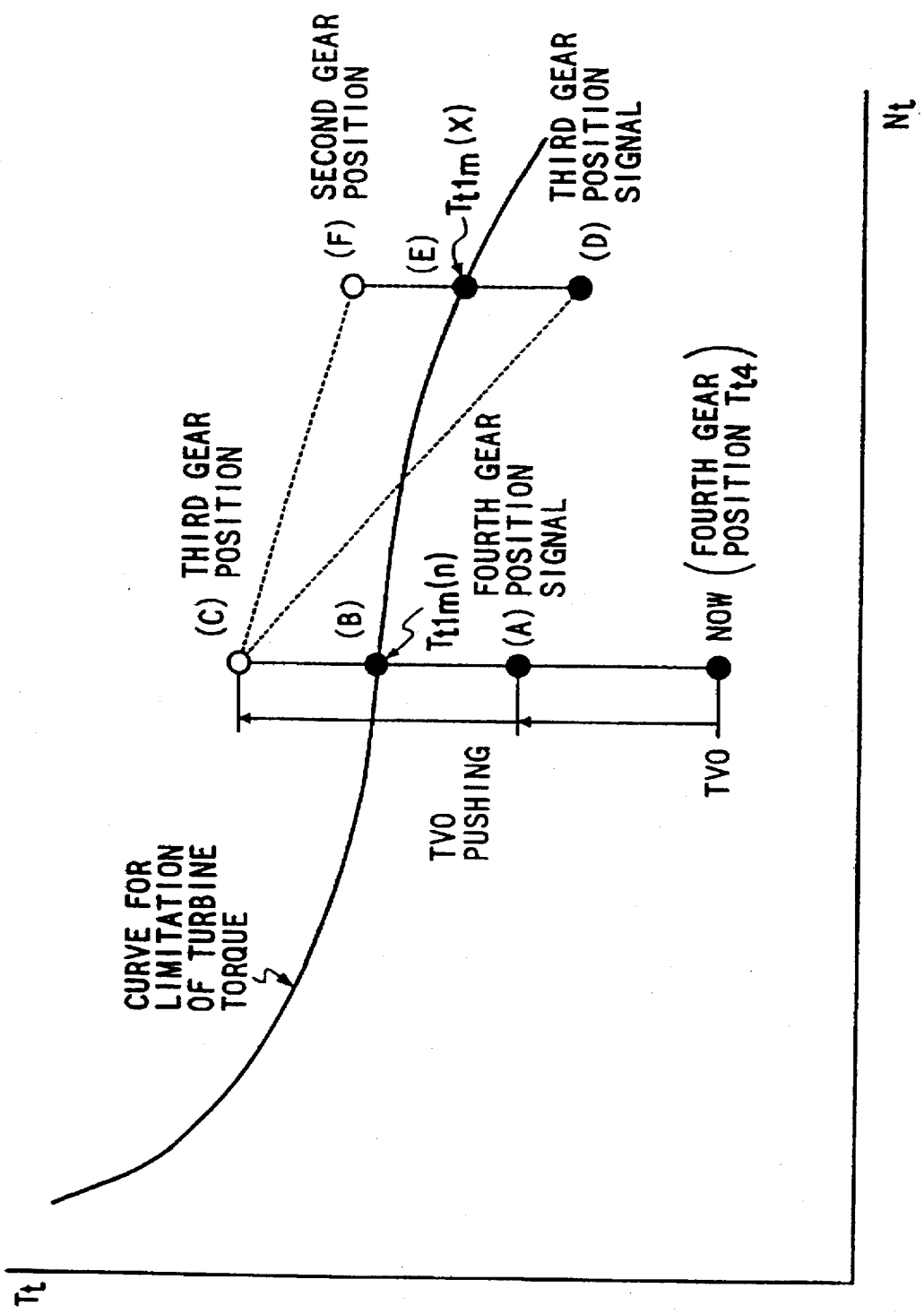
FIG. 13 is a graph showing a curve for limitation of turbine torque versus turbine rotating speed at a constant throttle opening.
Figure 14:
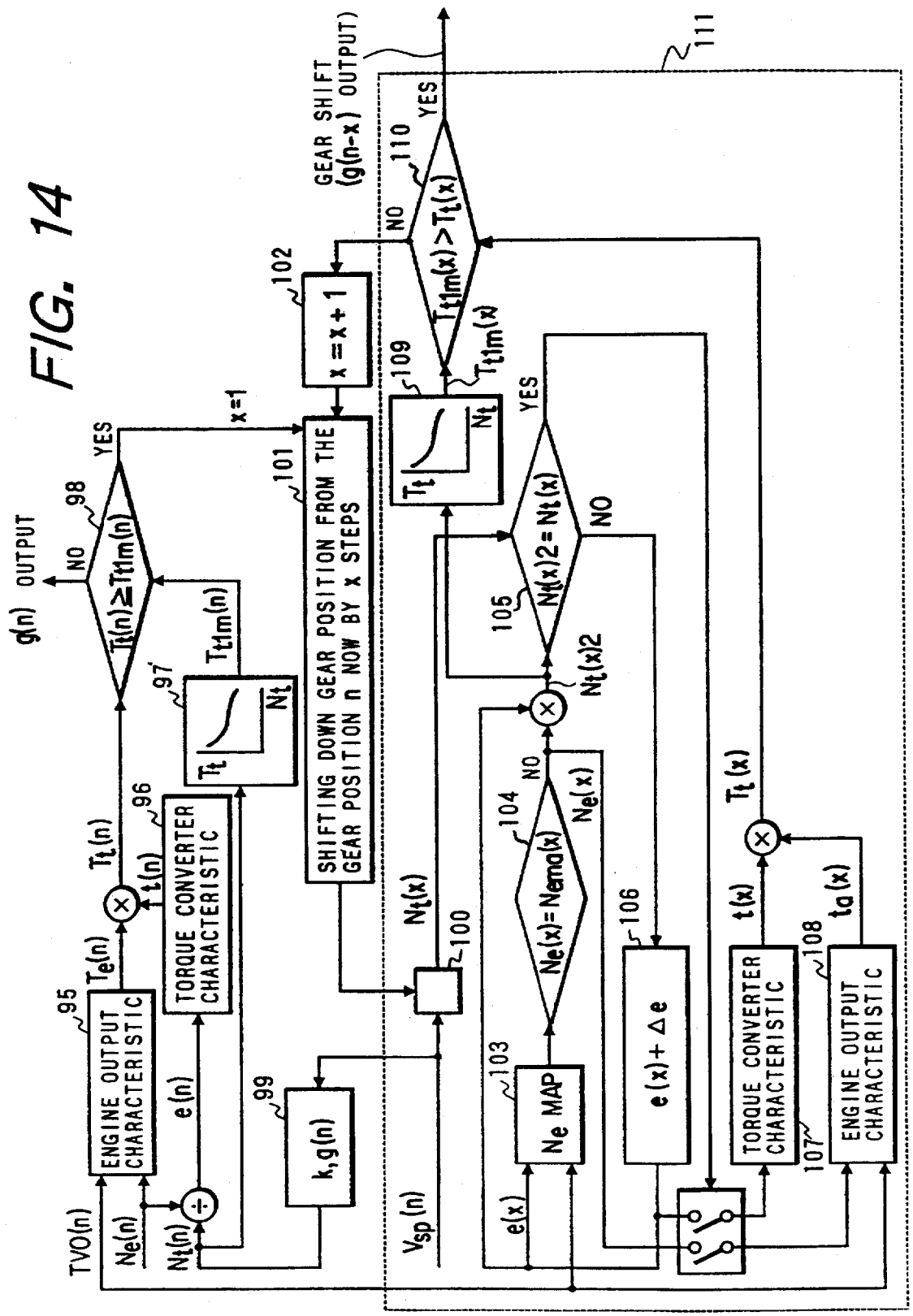
FIG. 14 is a block diagram showing the details of the control shown in FIG. 12.

FIG. 12 to FIG. 14 show the sixth embodiment according to the present invention. FIG. 12 shows a sixth embodiment in accordance with the present invention and is a block diagram showing a part of down-shifting control calculated by the ATCU 11 shown in FIG. 1. A turbine torque $T_t$ in a gear position now for a throttle opening TVO is estimated in block 91, and judgement on gear shifting is executed by comparing the turbine torque with a limit turbine torque $T_{tlm}$ in block 92. If the result satisfies the condition $T_t \geq T_{tlm}$, a turbine torque $T_t$ is calculated in assuming that the gear position or gear ratio now is shifted to a gear position or gear ratio in one position below now in block 91 and judgement on gear shifting is executed by comparing the turbine torque with a limit turbine torque $T_{tlm}$ in block 92. This process is repeated until the condition $T_t<T_{tlm}$ is satisfied. If the condition $T_t<T_{tlm}$ is satisfied, the gear position or gear ratio at this time in block 91 is output.

FIG. 13 is a graph showing a curve for limit turbine torque $T_{tlm}$ versus turbine rotating speed $N_t$ at a constant throttle opening TVO. In regarding to the limit turbine torque $T_{tlm}$, the inventors has conducted various kinds of experimental studies and the following is clarified. The limit turbine torque $T_{tlm}$ is determined by the throttle opening TVO and the turbine rotating speed $T_t$ independently of the gear position, that is, gear shifting from fourth gear position to third gear position, gear shifting from third gear position to second gear position, gear shifting from second gear position to first gear position. In other words, the equation $T_{tlm}=f(TVO,N_t)$ is held. Therefore, by using the equation or by storing the map of the equation in advance, using a throttle opening TVO and a turbine rotating speed $N_t$ at that time the limit turbine torque $T_{tlm}$ is calculated or extracted by retrieving to judge to perform a gear shifting by comparing with the turbine torque $T_t$. An example in a case where the gear position now is in the fourth gear position will be described below, referring to FIG. 13. The limit turbine torque $T_{tlm}$ is given in the fibre as a function of throttle opening TVO and turbine rotating speed $N_t$. The subscript (n) for the limit turbine torque $T_{tlm}$ means a value for the gear position now, and the subscript (x) means a value for the gear position after gear shift. The subscript 4 for the turbine torque indicates the fourth gear position. Here, it is assumed that the vehicle speed is kept constant before and after gear shift. When a driver steps more deeply on the throttle pedal to increase the throttle opening TVO now to a throttle opening of position (A), a turbine torque $T_{t4}$ corresponding to the point (A) is calculated and comparison with the limit turbine torque $T_{tlm}(n)$ in point (B) is executed. Since $T_{t4}<T_{tlm}(n)$ when the throttle opening of position is in (A), the gear position is kept in the fourth gear position. When a driver steps furthermore deeply on the throttle pedal to increase up to a throttle opening of position (C), a turbine torque $T_{t4}$ corresponding to the point (C) is calculated. Since $T_{t4} \geq T_{tlm}(n)$ in this time, the gear position n should be shifted down from the forth gear position now to the third gear position. However, the gear shifting signal to shift to the third gear position is not instantaneously output. Prior to outputting, $T_{t3}$, $N_{t3}$ are calculated by substituting 3 into n (As described above, the calculated $T_{t3}$ is a value with considering the gear ratio since the $V_{sp}$ is kept constant before and after gear shift. The same for $N_{t3}$.). Assume that the calculated result comes to the point (D) or point (F). If the $T_{t3}$ comes to the point (D), $T_{t3}<T_{tlm}(x)$. Then, the gear shifting signal for the third gear position is output to shift the gear position. On the other hand, if the $T_{t3}$ comes to the point (F), $T_{t3} \geq T_{tlm}(x)$. Therefore, $T_{t2}$, $N_{t2}$ are calculated by substituting 2 into n for the second gear position being lower than the third gear position by one position. Such calculation is repeated every certain small increment of time, and a gear shifting signal is output by selecting an ideal gear position. Thereby, the fluctuation in torque at gear shifting is small and the time required for gear shifting is short even in a skip gear shifting (for example, gear shift from the fourth gear position to the second gear position).

FIG. 14 is a block diagram showing the details of the control shown in FIG. 12. The subscript (n) attached to the symbols expressing signals means the value for the gear position now, and the subscript (x) means the value for a gear position in the lower speed side than the gear position now by x positions. An engine torque $T_e(n)$ is obtained by comparing a throttle opening TVO(n) from the throttle sensor 19 and an engine rotating speed $N_e(n)$ from the ECU 14 shown in FIG. 1 with the engine output power characteristic map in block 95. On the other hand, a turbine rotating speed $N_t(n)$ is obtained by multiplying a gear ratio g(n) to a vehicle speed signal $V_{sp}(n)$, and a slip ratio e(n) is calculated from the result and $N_e(n)$ to obtain a torque ratio t(n) by referring to the torque converter characteristic map in block 96. Using the result and $T_e(n)$ obtained before, a turbine torque $T_t(n)$ is calculated. Then, in block 97, a limit turbine torque $T_{tlm}(n)$ to the turbine rotating speed $N_t(n)$ with the throttle opening TVO(n) is extracted from the relationship between the limit turbine torque $T_{tlm}$ and the turbine rotating speed $N_t$ described in FIG. 13. In a turbine torque comparing part of block 98, the result is compared with $T_t(n)$ obtained before. If the condition $T_t(n) \geq T_{tlm}$ is not satisfied, the gear position is held in the gear position n now. If the condition is satisfied, the processing in block 111 is executed in assuming that the gear position is shifted to a gear position in the lower speed side than the gear position n now by x positions (herein, x=1) and the vehicle speed $V_{sp}(n)$ is constant before and after the gear shift. A turbine rotating speed $N_t(x)$ is obtained by multiplying a gear ratio x in the lower speed side than n by x positions (herein, x=1) to the vehicle speed $V_{sp}(n)$ now. Then, there is obtained a slip ratio e(x) of the torque converter balancing to the turbine rotating speed $N_t(x)$ in assuming that the throttle opening TVO(n) is held constant before and after the gear shift. For executing the above process, an $N_e$ map in block 103 is provided in advance by calculating the relationship engine rotating speed N, versus TVO and slip ratio e. An engine rotating speed $N_e(x)$ when a guessed slip ratio e(x) is given is obtained from the N, map in block 103, and iteration calculation is performed by obtaining adding a correction value Δe to the slip ratio e(x) as shown in block 106 until $N_t(x)$ becomes equal to the $N_t(x)$ obtained before in the turbine rotating speed comparing part of block 105. Using a slip ratio e(x) when $N_t(x)2$ becomes equal to $N_t(x)$ in block 105, a torque ratio t(x) is estimated from the torque converter characteristic map in block 107. And by comparing the engine rotating speed $N_e(x)$ in this time and the throttle opening TVO(n) with the engine output power characteristic map in block 108, an engine torque $T_e(x)$ is estimated. By making the product of the both values, a turbine torque $T_t(x)$ is obtained. Then, in block 109, a limit turbine torque $T_{tlm}(x)$ to the turbine rotating speed $N_t(x)$ with the throttle opening TVO(n) is extracted from the relationship between the limit turbine torque $T_{tlm}$ and the turbine rotating speed $N_t$ described in FIG. 13. In a turbine torque comparing part of block 110, the result is compared with $T_t(x)$ obtained before. If the condition $T_{tlm}(x) > T_t(x)$ is satisfied, a gear shifting signal is output to shift the gear position to a gear position in the lower speed side than the gear position now by x positions (herein, x=1). In the contrary, if the condition $T_{tlm}(x) > T_t(x)$ is not satisfied, the processing in block 111 is iteratively executed every certain small increment of time in assuming that the gear position is shifted to a gear position in the further lower speed side than the gear position n now by x positions (herein, x=2) and the vehicle speed $V_{sp}(n)$ is constant before and after the gear shift to select an ideal gear shifting position and output the gear shifting signal.

Instead of providing the $N_e$ map in block 103, it is possible to employ a method where iterating calculation is executed to scan the whole region by adding correcting values Δe and Δ$N_e$ to both of the slip ratio e(x) and the engine rotating speed $N_e(x)$. It is no need to say that the turbine rotating speed may be directly detected by the turbine rotating speed sensor 13 shown in FIG. 1 instead of calculating the turbine rotating speed $N_t(n)$ now using the vehicle speed $V_{sp}(n)$.

According to the method of this embodiment, a turbine torque is iteratively calculated and compared with a limit turbine torque using a throttle opening and a turbine rotating speed every certain small increment of time until a condition between the turbine torque and the limit turbine torque in magnitude is satisfied, and a gear position when the condition is satisfied is output as a gear shifting signal to execute gear shift. Thereby, the fluctuation in torque at gear shifting is small and the time required for gear shifting is short even in a skip gear shifting (for example, gear shift from the fourth gear position to the second gear position) since the gear is not linked to the middle gear position.

Figure 15:
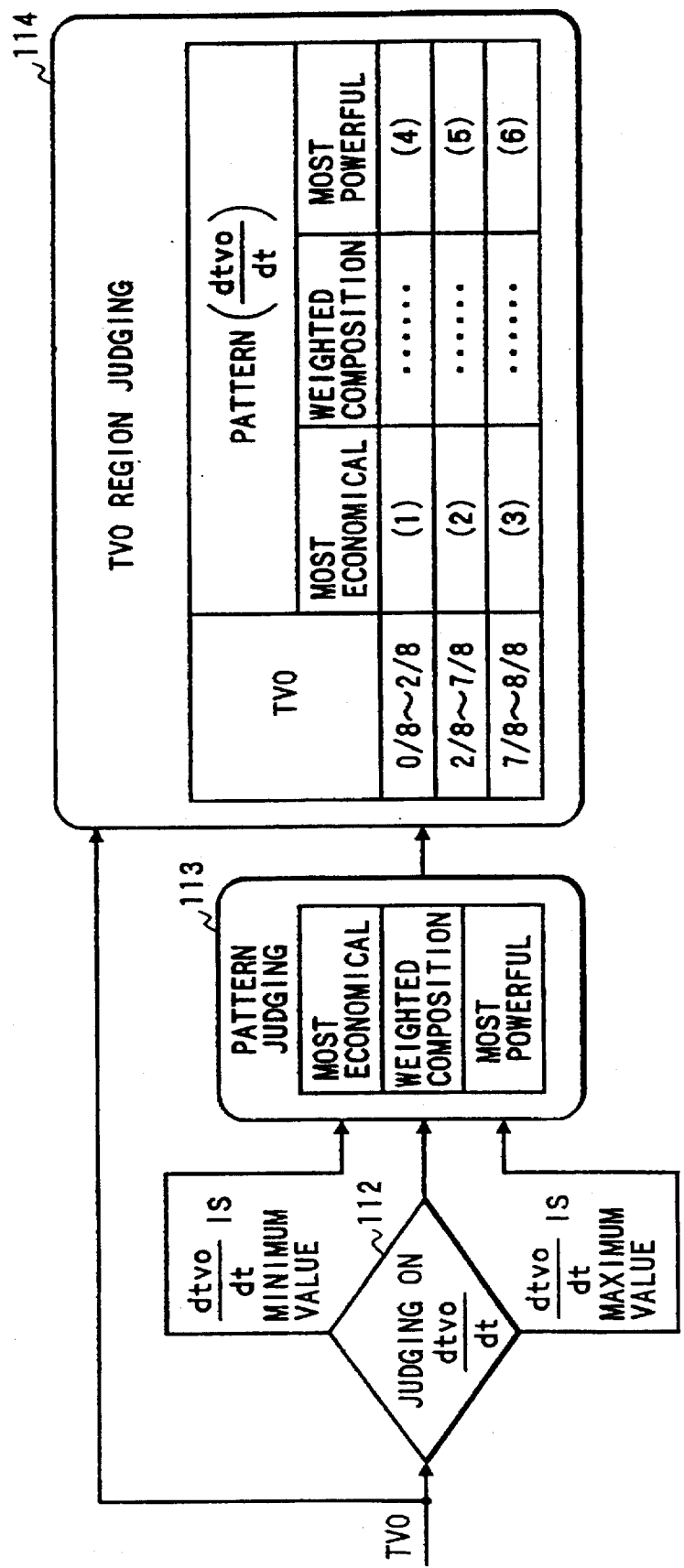
FIG. 15 shows a seventh embodiment in accordance with the present invention and is a block diagram showing a down-shifting control where judging is executed using time differentiation of throttle opening in addition to the control shown in the sixth embodiment.

FIG. 15 shows a seventh embodiment in accordance with the present invention and is a block diagram showing a down-shifting control where judging is executed using time differentiation of throttle opening in addition to the control shown in the sixth embodiment. By dividing the pattern region with considering not only the throttle opening TVO but also its time differentiation dTVO/dt, a gear shifting point can be calculated by continuously selecting between the low fuel consuming driving and the acceleration priority driving. In a judging process part for dTVO/dt shown in block 112, judgment is executed which the magnitude of dTVO/dt is a preset minimum value, or a preset maximum value, or between the both values. In a pattern judging process part in block 113, pattern for calculation is judged. In a TVO region judging process in block 114, a gear shifting pattern is determined. When dTVO/dt is the minimum value, a gear shifting pattern putting priority on the fuel consuming rate operation is selected. When dTVO/dt is the maximum value, a gear shifting pattern putting priority on the acceleration is selected. When dTVO/dt is between the both values, the gear shifting pattern putting priority on the fuel consuming rate operation and the gear shifting pattern putting priority on the acceleration are composed with weights. If a gear shifting pattern signal is the most economical pattern of the gear shifting pattern putting priority on the fuel consuming rate operation, a gear shifting point is calculated through any one of the methods (1) to (3) in the TVO region judging process part in block 114 depending on the magnitude of the throttle opening TVO. If a gear shifting pattern signal is the most powerful pattern of the gear shifting pattern putting priority on the acceleration, a gear shifting point is calculated through any one of the methods (4) to (6) in the TVO region judging process part in block 114 depending on the magnitude of the throttle opening TVO. If the gear shifting signal is between the most economical pattern and the most powerful pattern, a gear shifting point is calculated through weighted composition depending on the magnitude of the throttle opening TVO.

Therein, the calculations in (2), (5) in the TVO region judging process in block 114 are to be applied to the sixth embodiment according to the present invention described above. In the sixth embodiment, a gear shifting judgement is performed by comparing a turbine torque $T_t$ in the gear position now with a limit turbine torque obtained form the limit turbine torque $T_{tlm}$ curve versus turbine torque $T_t$ and turbine rotating speed $N_t$. If $T_t \geq T_{tlm}$, a turbine torque is calculated in assuming that the gear is shifted to a gear position in the lower speed side than the gear position now by one position to perform gear shifting judgement by comparing with the limit turbine torque $T_{tlm}$. This process is repeated until the condition $T_t < T_{tlm}$ is satisfied. If the condition $T_t < T_{tlm}$ is satisfied, the gear shifting position at this time is to be output. However, the limit turbine torque $T_{tlm}$ at the most economical pattern in (2) is different from that at the most powerful pattern in (5). Therefore, the $T_{tlm}$ curve is set in such that the limit turbine torque $T_{tlm}$ at the most economical pattern in (2) comes in the lower speed side than that at the most powerful pattern in (5).

Further, the calculations in (3), (6) in the TVO region judging process in block 114 are for storing vehicle speeds corresponding to an engine rotating speed smaller than the maximum limit value of the engine rotating speed $N_e$ by a given value in advance and shifting the gear down to a gear position by one position below the gear position now when a vehicle speed reaches the preset vehicle speed. And the calculations in (1), (4) in the TVO region judging process in block 114 are for storing vehicle speeds corresponding to a state near the maximum engine torque in the engine output power characteristic or corresponding to the stall rotation region of the torque converter and shifting the gear down to a gear position by one position below the gear position now when a vehicle speed reaches the preset vehicle speed.

As described above, according to the method of this embodiment, by dividing the pattern region with considering not only the throttle opening but also its changing rate, a gear shifting point is calculated in real time by continuously selecting a state between the economical to the powerful regions and the gear shifting position is output based on the calculation. Therefore, a long developing time having been used for setting the gear shift schedule map is eliminated, and the developing man-hour can be largely decreased.

Figure 16:
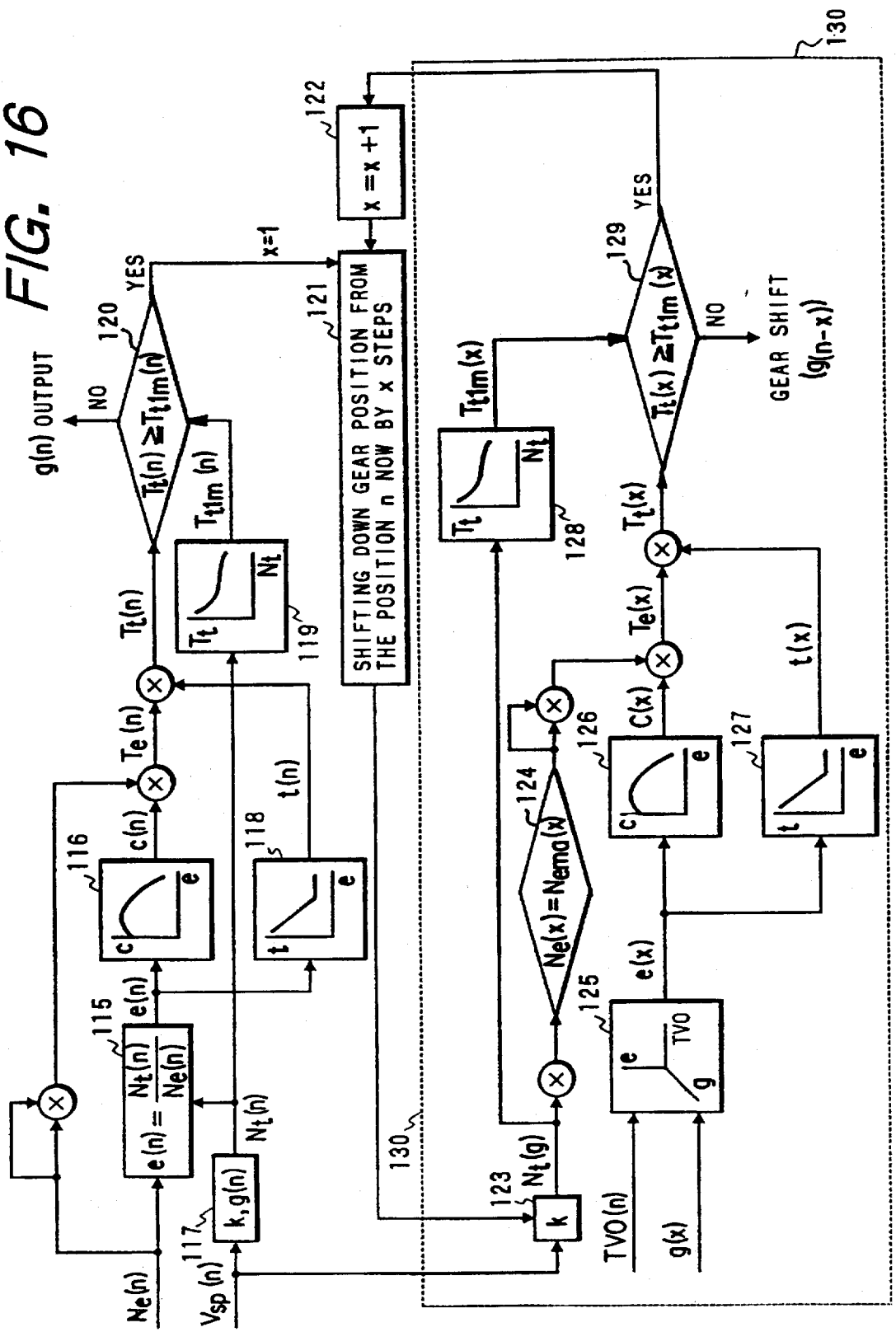
FIG. 16 shows an eighth embodiment in accordance with the present invention and is a block diagram showing a down-shifting control utilizing torque converter characteristic.

FIG. 16 shows an eighth embodiment in accordance with the present invention. In this embodiment, the engine torque $T_e$ and turbine torque $T_t$ are estimated using the torque converter characteristic without using the engine output characteristic. An engine rotating speed $N_e(n)$ and a turbine rotating speed $N_t(n)$ obtained by multiplying a gear ratio $g(n)$ in the gear state linking now to a vehicle speed $V_{sp}(n)$ are input to block 115 to calculate a slip ratio $e(n)$ of the torque converter through the equation $e(n)=N_t(n)/N_e(n)$. The slip ratio $e(n)$ is transmitted to block 116 and block 118. In block 116, a pump capacity coefficient $C(n)$ corresponding to the slip ratio $e(n)$ is extracted from the pump capacity coefficient characteristic stored in advance. An engine torque $T_e(n)$ is calculated by multiplying the pump capacity coefficient $C(n)$ to the square of the engine rotating speed $\{N_e(n)\}^2$ through the equation $T_e=C(n)\cdot\{N_e(n)\}^2$. On the other hand, in block 118, a torque ratio $t(n)$ corresponding to the slip ratio $e(n)$ is extracted from the torque converter characteristic stored in advance. A turbine torque $T_t(n)$ can be obtained by making production of both of the engine torque $T_e(n)$ and the torque ratio $t(n)$. Then, in block 119, a limit turbine torque $T_{tlm}(n)$ to the turbine rotating speed $N_t(n)$ with the throttle opening TVO(n) is extracted from the relationship between the limit turbine torque $T_{tlm}$ and the turbine rotating speed $N_t$ described in FIG. 13. In a turbine torque comparing part of block 120, the result is compared with $T_t(n)$ obtained before. If the condition $T_t(n)\geq T_{tlm}$ is not satisfied, the gear position is held in the gear position n now. If the condition is satisfied, the processing in block 130 is executed in assuming that the gear position is shifted to a gear position in the lower speed side than the gear position n now by x positions (herein, x=1) and the vehicle speed $V_{sp}(n)$ is constant before and after the gear shift. A turbine rotating speed $N_t(x)$ is obtained by multiplying a gear ratio x in the lower speed side than n by x positions (herein, x=1) to the vehicle speed $V_{sp}(n)$ now. An important point here is what value the slip ratio e of the torque converter takes when the gear is shifted to a gear position in the lower speed side than the gear position n now by x positions (herein, x=1). In regarding to this problem, the inventors has conducted various kinds of experimental studies and the following is clarified. The slip ratio e is univocally determined by the throttle opening TVO and the gear shifting state, that is, gear shifting from fourth gear position to third gear position, gear shifting from third gear position to second gear position, gear shifting from second gear position to first gear position. Let the gear shifting from the fourth gear position to the third gear position be expressed by subscript 43. The slip ratio is expressed by the following equation.

For gear shifting from the fourth gear position to the third gear position, $$e(x)_{43}=f(TVO_{43}).$$

Similarly, for gear shifting from the third gear position to the second gear position, $$e(x)_{32}=f(TVO_{32}).$$

Similarly, for gear shifting from the second gear position to the first gear position, $$e(x)_{21}=f(TVO_{21}).$$

Therefore, by using these equations or by storing the maps of these equations in advance, using a throttle opening TVO at that time the slip ratio $e(x)$ is calculated or extracted by retrieving in block 125. The engine rotating speed $N_e(x)$ for a gear position in the lower speed side by x positions (herein, x=1) is calculated by multiplying the predicted slip ratio $e(x)$ for a gear position in the lower speed side by x positions (herein, x=1) derived as described above to the turbine rotating speed $N_t(x)$ obtained before through the equation $N_e(x)=e(x)\cdot N_t(x)$. On the other hand, in block 126, a pump capacity coefficient $C(x)$ corresponding to the slip ratio $e(x)$ is extracted from the pre-stored pump capacity coefficient characteristic. And an engine torque $T_e(x)$ is calculated by multiplying square of the engine rotating speed $\{N_e(x)\}^2$ to the pump capacity coefficient $C(x)$, by the equation $T_e(x)=C(x)\cdot\{N_e(x)\}^2$. On the other hand, in block 127, a torque ratio $t(x)$ corresponding to the slip ratio $e(x)$ is extracted from the pre-stored torque converter characteristic. By making the product of the both values, that is, the engine torque $T_e(x)$ and the torque ratio $t(x)$, a turbine torque $T_t(x)$ is obtained. Then, in block 128, a limit turbine torque $T_{tlm}(x)$ to the turbine rotating speed $N_t(x)$ with the throttle opening TVO(n) is extracted from the relationship between the limit turbine torque $T_{tlm}$ and the turbine rotating speed $N_t$ described in FIG. 13. In a turbine torque comparing part of block 129, the result is compared with $T_t(x)$ obtained before. If the condition $T_{tlm}(x)>T_t(x)$ is satisfied, a gear shifting signal is output to shift the gear position to a gear position in the lower speed side than the gear position now by x positions (herein, x=1). In the contrary, if the condition $T_{tlm}(x)>T_t(x)$ is not satisfied, the processing in block 130 is iteratively executed every certain small increment of time in assuming that the gear position is shifted to a gear position in the further lower speed side than the gear position n now by x positions (herein, x=2) and the vehicle speed $V_{sp}(n)$ is constant before and after the gear shift to select an ideal gear shifting position and output the gear shifting signal.

The logic of estimating the turbine torque shown in FIG. 16 is a method in which the turbine torque is estimated using only the torque converter characteristic without using the engine output characteristic (the pre-stored engine torque $T_e$ versus engine rotating speed and the throttle opening TVO characteristic). Therefore, there is an advantage in that an input torque to a torque converter, that is, an engine torque $T_e$ can be estimated from a driving shaft torque $T_o$ even when in an engine having two operating regions of largely different torques, the engine is controlled in such that the operating state is changed between the both regions. The typical engine of such type is a lean-burn engine which has two operating regions in the same throttle opening TVO corresponding to lean air-fuel ratio A/F, one is theoretical air-fuel ratio A/F=14.7 and the other is lean air-fuel ratio A/F=23 to 25. The same thing can be said for an engine with super charger, an engine of variable suction length, an engine of variable valve timing, an engine of variable compression ratio or variable expansion ratio. Further, although a turbine rotating speed $N_t$ in the above embodiment has been calculated using a vehicle speed $V_{sp}$ and a gear ratio g, it is no need to say that the turbine rotating speed may be directly detected by the turbine rotating speed sensor. According to the method of this embodiment, a turbine torque is iteratively calculated and compared with a limit turbine torque using a throttle opening or a signal typically expressing the state of engine and a turbine rotating speed every certain small increment of time until a condition between the turbine torque and the limit turbine torque in magnitude is satisfied, and a gear position when the condition is satisfied is output as a gear shifting signal to execute pear shift. Thereby, the fluctuation in torque at gear shifting is small and the time required for gear shifting is short even in a skip gear shifting (for example, gear shift from the fourth gear position to the second gear position) since the gear is not linked to the middle gear position.

As preferred embodiments have been described above, according to the present invention, a gear shift point of a transmission can be calculated in real time since driving state of a vehicle and running state of the vehicle such as engine load such as throttle opening, vehicle speed, gear position or gear ratio and so on are detected and driving shaft torques before and after gear shift or fuel consumption rate is calculated corresponding to the detected signals and characteristics of the vehicle. In the case of considering both of the driving shaft torque and the fuel consuming rate, the calculating methods in calculating process are switched to calculate a gear shift point in real time and output the gear shift point based on the calculated result. Therefore, it is possible to largely decrease developing man-hour since the work for setting a gear shift schedule map having expended a long time is unnecessary, and there is also an effect to decrease the manufacturing cost since the capacity of the memory element having stored the gear shift schedule map can be decreased to minimum. Furthermore, it is possible to drive the vehicle with gear shift points corresponding to the driving state or running state of the vehicle and the demand of a driver since it is possible to determine an optimum gear shift point corresponding to change in engine characteristic over time and difference in characteristic of individual engine (for example, a gear shift point where acceleration performance of a vehicle in mint condition can be attained even if the torque of the engine is degraded over time).

Further, in an engine having largely varying torque characteristics depending on the operating state such as a lean burn engine, it is possible to find a gear shift point easily. The same thing can be said for an engine with super charger, an engine of variable suction length, an engine of variable valve timing, an engine of variable compression ratio or variable expansion ratio.

What is claimed is:

1. A control apparatus for an automatic transmission mounted on a vehicle having a vehicle power train comprising an engine, an automatic transmission having a torque converter, and detecting means for detecting an engine rotating speed, an engine load of said vehicle power train and a vehicle speed of the vehicle, which control apparatus comprises:

characteristic memory means for storing an engine output power characteristic, torque converter characteristic and a fuel consumption characteristic; and means for calculating a fuel consuming rate before a gear shift, and a fuel consuming rate after the gear shift assuming a throttle opening of said engine controlled to maintain an engine torque after the gear shift which is equal to engine torque before the gear shift based on said engine rotating speed, said engine load detected by said detecting means, said engine output power characteristic, said torque converter characteristic and said fuel consumption characteristic stored in said characteristic memory means; and outputting a gear shifting signal to said automatic transmission at a time when said fuel consuming rate before the gear shift becomes larger than said fuel consuming rate after the gear shift.

2. A control apparatus for an automatic transmission mounted on a vehicle having a vehicle power train comprising an engine, an automatic transmission having a torque converter, and detecting means for detecting an engine rotating speed, an engine load of said vehicle power train and a vehicle speed of the vehicle, said control apparatus controlling said vehicle power train using signals detected by said detecting means, which control apparatus comprises:

first characteristic memory means for storing vehicle characteristics;

first control means for obtaining a driving shaft torque before gear shift using at least signals expressing engine rotating speed, engine load detected by said detecting means and the engine output power characteristic stored in said first characteristic memory means; for calculating a value of a driving shaft torque after a gear shift wherein a gear position is shifted using the signals expressing said engine load and vehicle speed; and for outputting a gear shifting signal to said automatic transmission at a time when said driving shaft torque before gear shift becomes smaller than the calculated value of said driving shaft torque after the gear shift, plus a certain value;

second characteristic memory means for storing an engine output power characteristic, a torque converter characteristic and a fuel consumption characteristic; and second control means for calculating a fuel consuming rate before gear shift, and a fuel consuming rate after gear shift assuming a throttle opening of said engine controlled to maintain engine torque after the gear shift which is equal to engine torque before the gear shift, based on said engine rotating speed, engine load detected by said detecting means and said engine output power characteristic, said torque converter characteristic and said fuel consumption characteristic stored in said second characteristic memory means; and outputting a gear shifting signal to said automatic transmission at a time when said fuel consuming rate before the gear shift becomes larger than said fuel consuming rate after the gear shift;

said first control means and said second control means being switched depending on said running state detected by said detecting means.

3. A method of controlling an automatic transmission mounted on a vehicle having a vehicle power train comprising an engine, an automatic transmission having a torque converter, and detecting means for detecting an engine rotational speed, an engine load of said vehicle power train and a vehicle speed of the vehicle, said method comprising the steps of:

storing an engine output power characteristic, torque converter characteristic and fuel consumption characteristic in a characteristic memory;

calculating a fuel consuming rate before a gear shift, and a fuel consuming rate after the gear shift assuming a throttle opening of said engine controlled to maintain an engine torque after the gear shift which is equal to engine torque before the gear shift, based on said engine rotating speed, said engine load detected by said detecting means, said engine output power characteristic, said torque converter characteristic, and said fuel consumption characteristic stored in said second characteristic memory means; and outputting a gear shifting signal to said automatic transmission at a time when said fuel consuming rate before the gear shift becomes larger than said fuel consuming rate after the gear shift.

4. A method of controlling an automatic transmission mounted on a vehicle having a vehicle power train comprising an engine, an automatic transmission having a torque converter, and detecting means for detecting an engine rotational speed, an engine load of said vehicle power train and a vehicle speed of the vehicle, said method comprising the steps of:

providing a first control method wherein a driving shaft torque before gear shift is determined using signals expressing at least engine rotating speed, engine load detected by said detecting means and the engine output power characteristic stored in a first characteristic memory means; a driving shaft torque after gear shift is calculated assuming that a gear position is shifted using the signals expressing said engine load and vehicle speed; and a gear shifting signal is output to said automatic transmission at a time when said driving shaft torque before gear shift becomes smaller than the calculated value of said driving shaft torque after the gear shift, plus a certain value;

providing a second control method wherein a fuel consuming rate before gear shift is calculated; a fuel consuming rate after the gear shift is calculated assuming that a throttle opening of said engine is controlled to maintain an engine torque after the gear shift which is equal to engine torque before the gear shift based on said engine rotating speed, said engine load detected by said detecting means, said engine output power characteristic, a torque converter characteristic and a fuel consumption characteristic stored in a second characteristic memory means; and a gear shifting signal is output to said automatic transmission at a time when said fuel consuming rate before the gear shift becomes larger than said fuel consuming rate after the gear shift; and switching control of said automatic transmission between said first control method and said second control method, as a function of an operating state detected by said detecting means.

* * * * *